United States Patent [19]

Oprescu et al.

[11] Patent Number: 5,509,126
[45] Date of Patent: Apr. 16, 1996

[54] METHOD AND APPARATUS FOR A DYNAMIC, MULTI-SPEED BUS ARCHITECTURE HAVING A SCALABLE INTERFACE

[75] Inventors: Florin Oprescu, Sunnyvale; Michael D. Teener, Santa Cruz, both of Calif.

[73] Assignee: Apple Computer, Inc., Cupertino, Calif.

[21] Appl. No.: 25,711

[22] Filed: Mar. 16, 1993

[51] Int. Cl.⁶ ................................................ B06F 13/14
[52] U.S. Cl. .................................. 395/307; 395/286
[58] Field of Search ............................ 395/325, 425, 395/550; 364/200; 379/106

[56] References Cited

U.S. PATENT DOCUMENTS

| | | | |
|---|---|---|---|
| 4,771,391 | 9/1988 | Blasbalg | 364/200 |
| 4,839,891 | 6/1989 | Kobayashi et al. | |
| 4,868,734 | 9/1989 | Idleman et al. | 364/200 |
| 5,204,896 | 4/1993 | Oliver | 379/106 |
| 5,237,676 | 8/1993 | Arimilli et al. | 395/550 |
| 5,280,587 | 1/1994 | Shimodaira et al. | 395/325 |
| 5,280,623 | 1/1994 | Sodos et al. | 395/325 |
| 5,315,706 | 5/1994 | Thomson et al. | 395/325 |
| 5,333,294 | 7/1994 | Schnell | 395/425 |
| 5,379,386 | 1/1995 | Swarts et al. | 395/325 |

FOREIGN PATENT DOCUMENTS

| | | |
|---|---|---|
| 0254047 | 1/1988 | European Pat. Off. |
| 9217014 | 10/1992 | European Pat. Off. |

Primary Examiner—Jack B. Harvey
Assistant Examiner—David A. Wiley
Attorney, Agent, or Firm—Blakely, Sokoloff, Taylor & Zafman

[57] ABSTRACT

A dynamic, multi-speed bus architecture comprising a plurality of variable speed, fixed size links for coupling a plurality of devices together in an arbitrary network arrangement in which each device coupled to the bus comprises a novel communications node having a scalable interface for enabling the local hosts of the devices to communicate via the multi-speed bus. The interface provided within each node comprises a first module and a second module interconnected via a fixed speed, variable size bus. The first module is coupled to the local host of a device via a fixed speed, fixed size bus for converting a first data packet received from the local host into a second data packet of an appropriate form for transmission on the fixed speed, variable size bus disposed between the two modules. The second module receives the second data packet and converts it into a third data packet of an appropriate form for transmission onto the variable speed, fixed size link coupling the device to the multi-speed bus. The first and second modules further perform the same conversions in reverse so as to provide for reception of data packets transferred on the multi-speed bus. With such a design of the interface disposed between the link of the multi-speed bus and the local host of each device, it is possible to provide the components for performing the data packet transfer conversions necessary to realize a true dynamic, multi-speed bus in addition to providing a truly scalable architecture having upward compatibility with future devices.

46 Claims, 8 Drawing Sheets

Transmit Operation

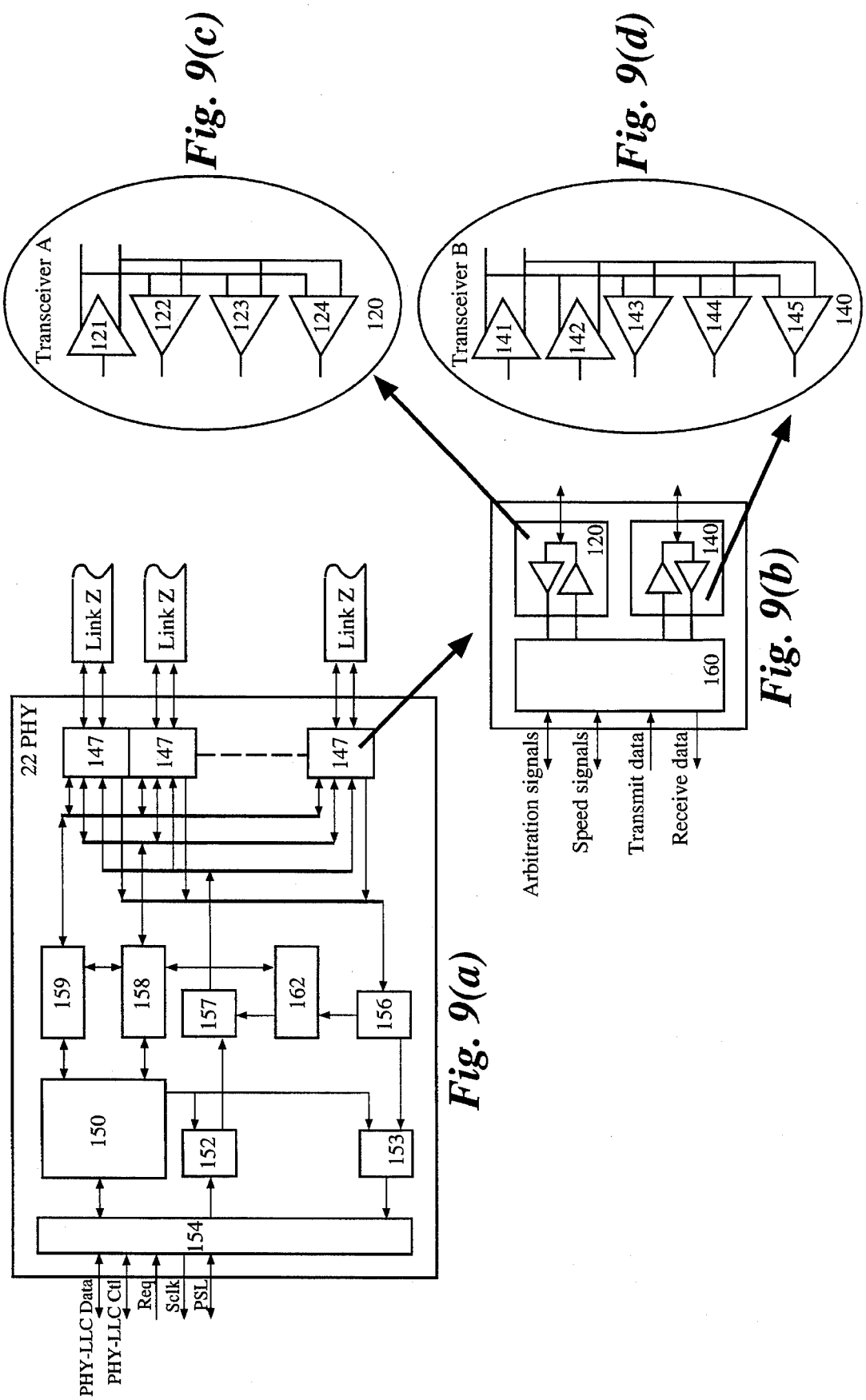

METHOD AND APPARATUS FOR A DYNAMIC, MULTI-SPEED BUS ARCHITECTURE HAVING A SCALABLE INTERFACE

BACKGROUND OF THE INVENTION

Field of the Invention

The present invention relates to a bus architecture communications scheme for enabling communications between a plurality devices or nodes in a computer system, and more particularly, to a dynamic, multi-speed bus architecture capable of performing data packet transfers at variable and upgradable speeds between fixed speed and multi-speed nodes.

Computer devices within a given computer system, such as a disk drive, a CRT, a printer and the like, need the ability to convey signals between themselves. In the past, this has been accomplished by means of a standard I/O bus which comprises a plurality of transmission lines and acts as a shared communications path for interconnecting several devices in the system. Hereinafter, all computer devices will be referred to as "nodes" for simplicity irregardless of whether or not the specific device has a higher intelligence otherwise known as a "local host". In addition, the term local host will be used irregardless of whether or not it comprises hardware or hardware and software.

In most bus architectures used today, each node in the system need only plug into the bus to be theoretically connected to each of the other nodes in the system. However, a data packet transmitted on this type of shared bus by a particular node is available for reception by all other nodes coupled to the bus such that the data packet transfers must be performed at a fixed speed based on the speed of the slowest node. Thus, the fixed speed of the data packet transfers on a particular bus must be defined prior to implementation of the bus itself since it is dependent upon the technological capability of the nodes at the time.

Hence, it would be desirable to implement a true dynamic, multi-speed bus having the capability of upward compatibility with newer and faster nodes while providing an optimum, cost-performance system implementation. As technology evolves rapidly, new nodes become available which are capable of significantly higher speeds than the nodes already implemented on a particular bus. In order to implement the newer, faster nodes in a computer system, one alternative is to create a new bus architecture (in addition to a new standard) each time the technology makes a new step. This is obviously quite an expensive solution. However, another alternative is to create a bus architecture in which new nodes can coexist with the old nodes. While less than optimal, this alternative is a lot more attractive from a practical point of view. Such new nodes will dearly have to operate at a reduced speed when communicating with older (and slower) nodes otherwise the older nodes will not be able to decode the data packets transferred on the bus. On the other hand, depending upon the bus topology, the higher speed nodes can communicate with other higher speed nodes at higher than the minimal speed, thus increasing the bus utilization. This upward compatibility requirement necessitates the development of a bus architecture that will accommodate speed upgrades with a minimum of complexity (minimum cost, minimum design effort and minimum upgrade time).

Another dimension to the problem of creating a dynamic, multi-speed bus having scalable speed transmission capabilities is cost. For a given technological level, the cost of a node is clearly a factor of its speed capability. There are very simple nodes which need to communicate on the bus only at a minimum speed such that the overall cost of the node is the most significant criterion (as opposed to the performance criterion). Examples of such nodes are a mouse, a keyboard, a microphone, etc. Clearly such nodes should not have to communicate at a speed faster than the minimum required transmission speed. At the same time, there exist on the bus very complex (and inherently expensive) nodes for which their performance is the significant criterion (as the cost of the communications channel of the bus becomes insignificant compared with the cost of the node itself). Examples of such nodes are a printer, a monitor, a computer, a high end storage node, etc. Such nodes need to communicate at significantly higher speeds than the minimum required transmission speed.

Therefore, in order for a bus to be able to accommodate various generations of nodes as well as nodes of varying cost ranges (and consequently of varying performance capabilities), it is desirable to provide a dynamic, multi-speed bus having the capability of upward compatibility with newer nodes able to operate at faster transmission speeds.

Accordingly, it is an object of the present invention to provide a method and apparatus for a scalable, multi-speed bus architecture which enables variable speed data packet transfers between newer, faster speed nodes and older, slower speed nodes coupled together via at least one variable speed, fixed size link forming a single interconnection of the multi-speed bus.

Another object of the present invention is to provide a method and apparatus for a scalable, multi-speed bus architecture in which the nodes coupled to the multi-speed bus comprise a novel interface architecture between the local hosts of the nodes and their connections to the multi-speed bus wherein the arrangement of the components of the interface greatly radiitares both design level and field level upgrades of the multi-speed bus and the nodes coupled thereto.

Another object of the present invention is to provide a method and apparatus for a transmit operation between nodes coupled together via a variable speed, fixed size link of a multi-speed bus in which a fixed speed, fixed size, variable length data packet transfer from a node's local host is converted into a fixed speed, variable size, variable length data packet transfer which is further converted into variable speed, fixed size, variable length data packet transfer for transmission on the link of the multi-speed bus.

A further object of the present invention is to provide a method and apparatus for a receive operation between nodes coupled together via a variable speed, fixed size link of a multi-speed bus in which a variable speed, fixed size, variable length data packet transfer from the link is converted into a fixed speed, variable size, variable length data packet transfer which is further converted into fixed speed, fixed size, variable length data packet transfer for reception by a local host of the receiving node.

Yet another object of the present invention is to provide a method and apparatus for a multi-speed bus architecture pursuant to the IEEE P1394 standard in which a physical channel interface chip and a link layer chip are coupled between a local host of a node and a multi-speed, serial bus for providing a fixed speed interface between the local host and the serial bus suitable for upward compatibility with faster nodes and the implementation of an isolation barrier therein.

BRIEF SUMMARY OF THE INVENTION

In a computer system pursuant to the present invention, a plurality of devices are arbitrarily coupled together via a plurality of variable speed, fixed size links forming the multi-speed bus. Each device of the computer system comprises a communications node associated with a local host which must communicate with the local hosts of the other devices in the computer system. In order to provide a means for converting the data packets generated by the local hosts into data packets of an appropriate form for transfer onto the multi-speed bus (and vice versa for the transfer of data packets from the bus to the local hosts), the present invention provides in each node a scalable interface architecture.

This interface architecture comprises a first module and a second module interconnected via a fixed speed, variable size bus disposed between the local host via a fixed speed, fixed size bus and the variable speed, fixed size link (which connects the local host to the multi-speed bus). With such a design of the communications node within each device, it is possible to provide the components for performing the data packet transfer conversions necessary to realize a true dynamic, multi-speed bus in addition to providing a truly scalable architecture having upward compatibility with future devices.

In a method for the transmit operation of the present invention in which data packets are transferred from a first node to a second node via a first variable speed, fixed size link, a first fixed size, variable length data packet is generated by the local host of the first node. This data packet is transferred to a first buffer of the first module via a first fixed speed, fixed size bus. The first module comprises at least the first buffer, a first converter and a first controller for managing the operations of the first module. The first data packet is supplied from the first buffer as input to the first converter of the first module where the first data packet is converted into a second variable size, variable length data packet. This data packet is then transferred from the first converter onto a second fixed speed, variable size bus where it is received by a second converter of the second module. The second module comprises at least the second converter, a port for connecting the second module to the first link and a second controller for managing the operations of the second module. The second converter converts the second data packet into a third fixed size, variable length data packet which is subsequently transferred to the second node via the first link.

In a method for the receive operation of the present invention in which data packets transferred by a first node are received by a second node via the first variable speed, fixed size link, a fourth fixed size, variable length data packet is received from the link by the second converter of the second module. The fourth data packet is converted into a fifth variable size, variable length data packet. This fifth data packet is transferred onto the second fixed speed, variable size bus and subsequently supplied as input to the first converter of the first module. The fifth data packet is then converted into a sixth fixed size, variable length data packet which is supplied as input to the first buffer. Finally, the sixth data packet is transferred to the local host via the first fixed speed, fixed size bus.

Additionally, the present invention also provides a means for transmitting speed messages between the first and second modules and between adjacent nodes so that the converters of the modules can be set to the correct size setting for converting the first data packet into the second data packet, for converting the second data packet into the third data packet, for converting the fourth data packet into the fifth data packet and for converting the fifth data packet into the sixth data packet. Furthermore, the present invention provides a suitable fixed speed interface in which an isolation barrier required by the multi-speed bus can be implemented. Finally, the present invention also provides a power off sense line between the first and second modules which prevents a component failure from occurring in a situation where a powered module may attempt to transmit to an unpowered module.

BRIEF DESCRIPTION OF THE DRAWINGS

The objects, features and advantages of the present invention will become apparent from the following detailed description of the present invention in which:

FIG. 9a is a block diagram of the PHY module as utilized in the present invention.

FIG. 9b is an expanded block diagram showing the components of a single port of the PHY module shown in FIG. 9a.

FIG. 9c is an expanded diagram showing the components of the first transceiver of the port shown in FIG. 9b.

FIG. 9d is an expanded diagram showing the components of the second transceiver of the port shown in FIG. 9b.

DETAILED DESCRIPTION OF THE INVENTION

The present invention relates to a method and apparatus for a dynamic, multi-speed bus having the capability of upward compatibility with future nodes able to operate at faster transmission speeds. In the following description, numerous details are set forth such as device speeds, device types, operating modes, etc., in order to provide a thorough understanding of the present invention. It will be obvious, however, to one skilled in the art that these details are not required to practice the present invention. In other instances, well-known circuits, methods and the like are not set forth in detail in order to avoid unnecessarily obscuring the present invention.

Figure 1:
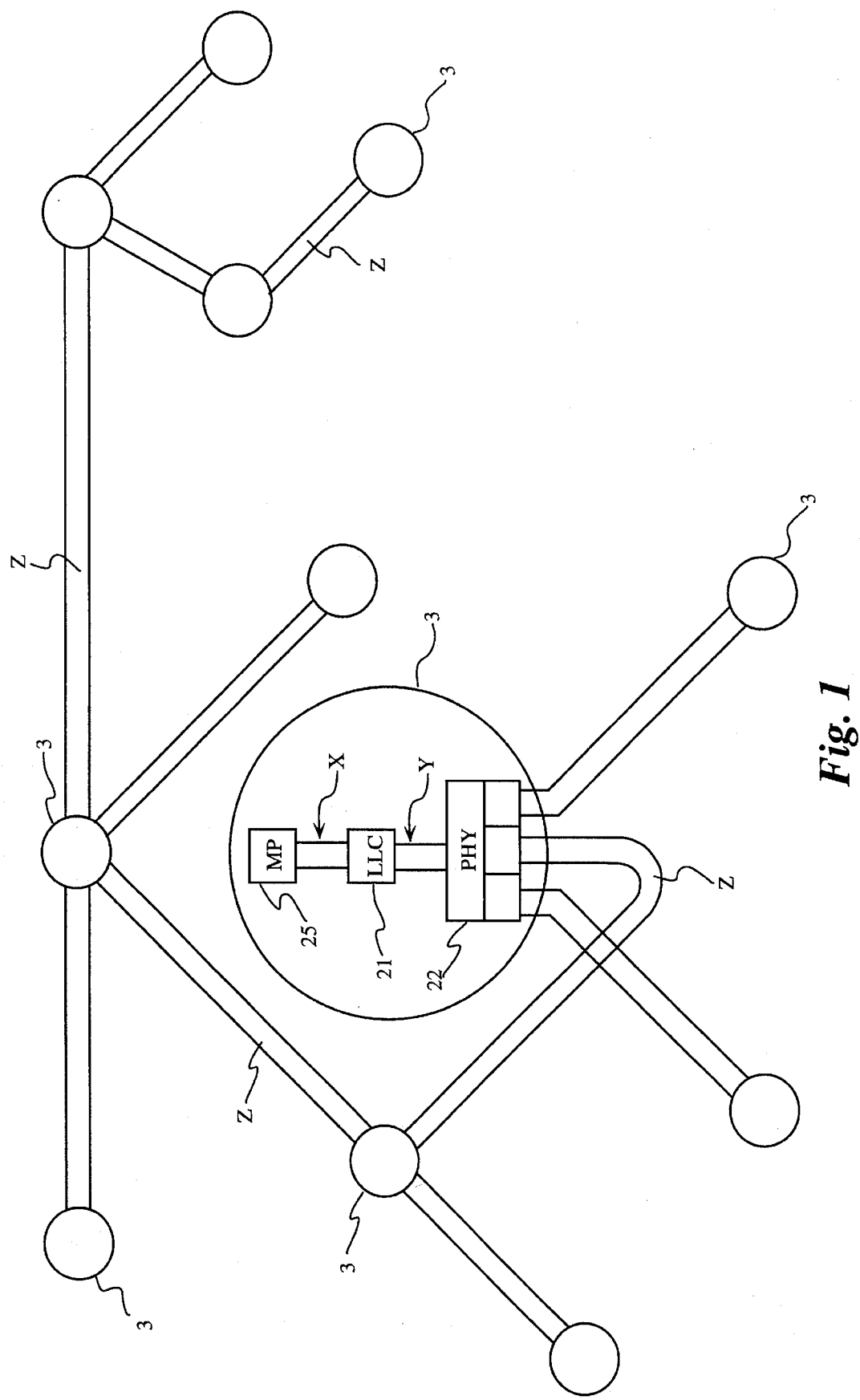
FIG. 1 is a block diagram showing nodes interconnected in an arbitrary topology pursuant to the P1394 bus architecture standard, including the presentation of the scalable PHY-LLC interface (denoted as the bus Y) for a particular node.

With reference to FIG. 1, the present invention comprises a plurality of nodes 3 arbitrarily coupled to each other via a point-to-point interconnected bus generally referred to as a multi-speed serial bus. For simplicity in the following descriptions, when reference is made to the entire bus comprising the point-to-point interconnections (as shown in FIG. 1), it will be referenced as "the multi-speed serial bus", while each individual interconnection (also forming a multi-speed serial bus) will be referenced as "the multi-speed serial link Z".

The purpose of the multi-speed serial links Z is to enable variable speed transfers of data packets throughout the multi-speed serial bus, which data packets have a fixed size and a variable length (or width). The term variable speed transfer refers to the fact that the transfer of data packets on the multi-speed serial bus, can be performed at one of a plurality of speeds, for example, at 100, 200, 300 or 400 Megatransfers per second (actually these are only abbreviated notations where 100 Mtps=98.304 Mtps). So as to obtain optimum bus performance, data packet transfers on the links Z should be performed at the maximum speed possible which is determined by the lower value between the speed capabilities of a transmitting node, an intended receiving node and all interposed relaying nodes which relay (or retransmit) the actual data packets along the bus. Furthermore, it is preferable that the transfer of data packets on each of the links Z forming the multi-speed bus be bi-directional.

Most nodes 3 within a computer system require that the transfer of data packets to and from its local host 25 be at a fixed speed Fs and that the data packet itself be of a fixed size Fz (i.e., normally of 8, 16 or 32 bits which is the number of transmission channels in a standard I/O bus) so that the data packet can be properly processed by the local host 25. Also, a local host 25 will conduct data packet transfers of variable length which is dependent upon the size of the host's I/O bus and the amount of data bits forming a data packet. In the terminology used herein, the speed of a particular data packet transfer refers to the rate of data transmission or baud rate, while the size of a data packet refers to the number of data bits that are simultaneously transmitted during a data packet transfer. In addition, the length of a data packet represents the number of successive data bit transfers required to transfer a complete data packet.

Since most local hosts 25 require data packet transfers to be of a fixed size Fz and at a fixed speed Fs, the problem that must be overcome to interface a local host 25 of a node 3 with a link Z (having a different fixed size Fz corresponding to one data bit due to the serial nature of the link Z) is to design and implement a bus architecture scheme in which the variable speed Vs, fixed size Fz and variable length VL data packet transfer on the link Z can be converted to a fixed speed Fs, fixed size Fz and variable length VL data packet transfer for reception by the local host 25. Conversely, because of the bi-directional nature of the present invention, the same conversion process must also work in reverse for data packet transfers from the local host 25 onto the multi-speed link Z. Additionally, in order to achieve a bus architecture which also permits scalability in terms of the implementation of newer and faster nodes 3 with older and slower nodes 3, what is provided by the present invention is a novel fixed speed Fs, variable size Vz, variable length VL interface between the multi-speed link Z and the local host 25.

Figure 2:
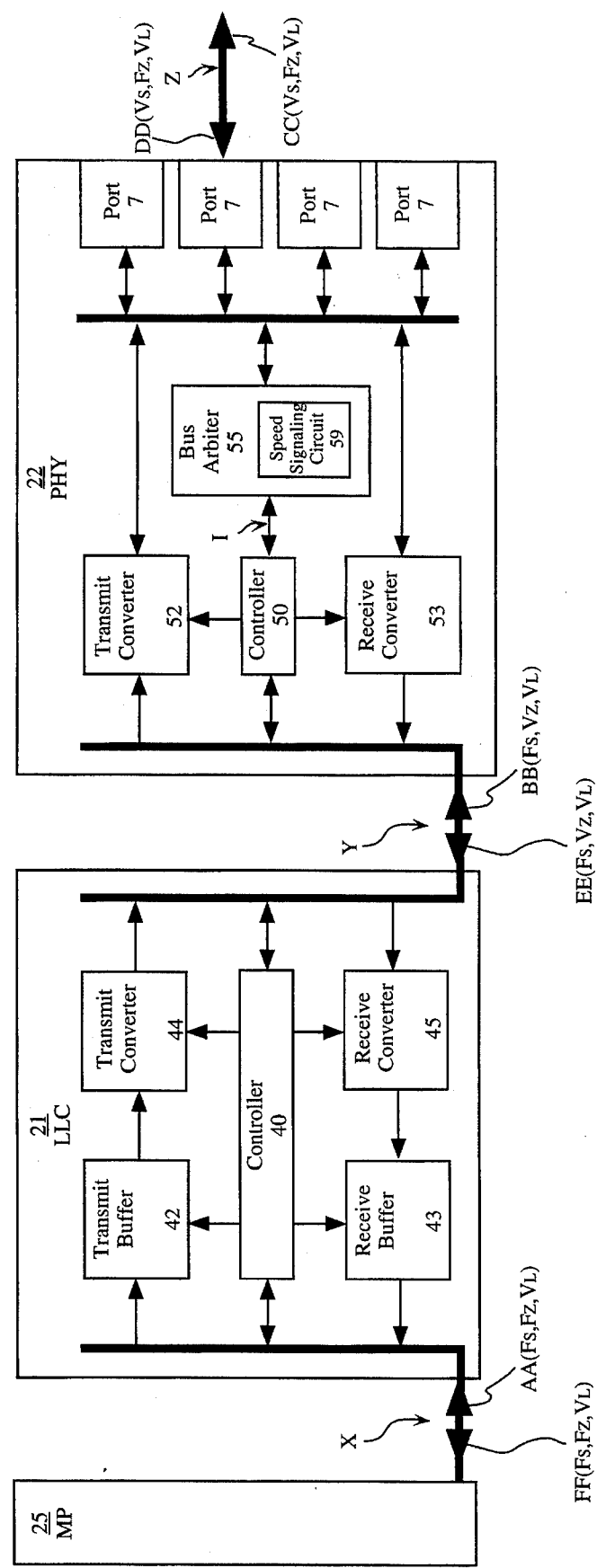
FIG. 2 is a block diagram showing a specific arrangement of the sub-components of each the PHY and LLC chips in a particular node, including the transactions between those sub-components.

According to a first embodiment of the present invention, as shown in FIG. 2, the fixed speed Fs, variable size Vz, variable length VL interface (hereinafter referred to as the bus Y) having scalable capabilities is provided between a first module 21 and a second module 22 implemented in each node 3 between the local host 25 and the multi-speed link Z. The first module 21 is coupled to the local host 25 via the standard fixed speed Fs, fixed size Fz, variable length VL bus X and the second module 22 is couple to the link Z via its external ports 7.

The first module 21 comprises a transmit FIFO buffer 42, a transmit converter 44, a receive FIFO buffer 43, a receive converter 45 and a controller 40 which comprises the logic circuitry for controlling the operation of the buffers 42, 43 and the converters 44, 45. The second module 22 comprises a transmit converter 52, a receive converter 53 and a controller 50 which comprises the logic circuitry for controlling the operation of the converters 52, 53. In addition, the second module 22 further comprises a plurality of external ports 7 for interconnecting a plurality of other nodes 3 via a plurality of multi-speed serial links Z, a bus arbiter 55 for arbitrating among the various nodes 3 on the multi-speed serial bus and an internal bus I for the transfer of control information between the controller 50 and the bus arbiter 55. Furthermore, it is preferred that the bus arbiter 55 comprise a speed signaling circuit 59 for the transmission and reception of speed messages as will be described below.

In this first embodiment, it is also preferred that the buffers 42, 43 of the module 21 be included within the physical boundaries of the module 21 and that the controller 40 comprise a memory controller for managing these internal storage areas. However, with respect to an alternate implementation of the first module 21, the buffers 42, 43 may be implemented as part of the local host's memory or as a separate memory, whereas the controller 40 would then comprise a memory access controller for managing the external storage areas.

Each of the converters 44, 45, 52 and 53 comprise at least one multiplexor for multiplexing the data bits of the received data packets into a resultant data packet having a size and length appropriate for retransmission. With respect to the receive converter 53, this converter comprises a standard serial to parallel multiplexor. It receives data bits on one line with a variable input clock of 100 MHz, 200 MHz or 400 MHz. In its operation, the output clock is derived by dividing the input clock by 2, 4 or 8, respectively, under the control of the PHY controller 50. This clock controls the parallel output flow of data bits on either 2, 4 or 8 active lines under the control of the PHY controller 50 and also serves as the clock for the fixed speed Fs, variable size Vz bus Y. The receive converter 45 comprises a set of eight standard serial to parallel multiplexors. Depending upon the size of the data packet transferred on the fixed speed Fs, variable size Vz bus Y, the LLC controller 40 activates either 2, 4 or all 8 multiplexors. Each multiplexor receives the data bits serially with an input clock of 50 MHz derived from the fixed speed Fs, variable size Vz bus Y and outputs data bits in parallel on either 4, 8 or 16 lines with a clock of 12.5, 6.25 or 3.125 MHz, respectively, which is derived by dividing the input clock by 4, 8 or 16, respectively, under the control of the LLC controller 40.

Similarly, the transmit converter 44 comprises a set of 8 standard parallel to serial multiplexors. Depending upon the width of the fixed speed Fs, variable size Vz bus Y, the LLC controller 40 activates either 2, 4 or all 8 multiplexors. Each multiplexor receives data bits in parallel on either 4, 8 or 16 lines with a receive dock of 12.5, 6.25 or 3.125 MHz, respectively, under the control of the LLC controller 40. The receive dock is derived from the 50 MHz dock of the fixed speed Fs, Variable size Vz bus Y. Each of these multiplexors has one serial output operating at 50 MHz. With respect to the transmit converter 52, this converter 52 comprises a standard parallel to serial multiplexor. It receives data bits in parallel on 2, 4 or 8 input lines using the bus Y fixed frequency clock of 50 MHz. The output is always 1 bit wide, and depending upon the speed at which the data packet is transferred on the link Z, the output clock can be 100 MHz, 200 MHz or 400 MHz. Again, this selection is controlled by the PHY controller 50. The output clock is generated by the PHY and it is divided appropriately to create the 50 MHz clock for the bus Y.

In a transmit operation of the present invention, a first data packet AA of a first variable length Vt is transferred to the first module 21 via the fixed speed Fs, fixed size Fz bus X. The first data packet AA is received by the transmit buffer 42 and supplied to the transmit converter 44 where it is converted to a second data packet BB of a second variable length VL for transmission on the fixed speed Fs, variable SLZe Vs bus Y. This second data packet BB is then immediately supplied from the bus Y to the transmit converter 52 of the second module 22 where it is converted to a third data packet CC of a third variable length VL for transmission onto the variable speed Vs, fixed size Fz link Z. In example of this conversion process, for a 100 Mtps data packet transfer on the link Z, converter 44 will activate two parallel to serial converters, each converting 16 bit parallel input data received from the buffer 42 into 1 bit serial data, the combination of which forms the second data packet BB. Converter 52 then converts the 2 bit parallel data into 1 bit serial data representing the third data packet CC. For a 400 Mtps data transfer on the link Z, converter 44 will activate 8 parallel to serial converters, each converting 4 bit parallel input data received from the buffer 42 into 1 bit serial data to form the second data packet BB. Consequently, converter 52 converts this 8 bit parallel data into 1 bit serial data again representing the third data packet CC.

In order to enable the controller 40 to set the transmit converter 44 to the correct size setting for converting the first data packet AA into the second data packet BB, the controller 40 must be informed of both the fixed speed of the bus Y and the speed at which the third data packet CC is to be transmitted onto the link Z (i.e., the speed at which the link Z will be operating for that particular transfer). Since the speed of the bus Y is set at a fixed value, this value can either be stored in the memory storage area associated with the controller 40 or may be hardwired into the circuitry of the transmit converter 44. So as to inform the controller 40 of the speed at which the third data packet CC will be transmitted onto the link Z, a speed message comprising this information must be transmitted from the local host 25 to the controller 40 prior to receipt of the first data packet AA. (The speed message is then subsequently transmitted to the speed signaling circuit 59 of the second module 22 in order that it can be placed on the link Z for transmission to the adjacent relaying nodes 3 coupled to the other end of the links Z). Through the use of this speed information, the controller 40 can determine the size of the second data packet BB by dividing the value of the third data packer's speed with the value of the fixed speed of the bus Y. Additionally, a value representing the total length of the data packet AA must also be generated by the local host 25 and transmitted to the controller 40 prior to the transfer of the data packet AA so as to apprise it of the number of individual data bit transfers it will need to make so as to transfer the entire data packet BB on the bus Y.

Furthermore, in order to enable the controller 50 to set the transmit converter 52 to the correct size for converting the second data packet BB into the third data packet CC, the controller 40 must transmit to the controller 50 a value representing the size of the expected second data packet BB. The controller 50 then sets its transmit converter 52 to the correct setting for receiving the second data packet BB and converting it into the third data packet CC having a size of one data bit for transfer onto the multi-speed serial link Z. Additionally, when the first module 21 has completed transferring the second data packet BB on the bus Y, the controller 40 further transmits to the second module 22 an end of transmission message which informs the controller 50 of the last data bit transfer it must perform in order to transfer the entire third data packet CC onto the link Z.

In a receive operation of the present invention, a fourth data packet DD of a fourth variable length is received by the second module 22 from the multi-speed link Z and converted into a fifth data packet EE of a fifth variable length by the receive converter 53. This fifth data packet EE is immediately transferred to the receive converter 45 of the first module 21 via the fixed speed Fs, variable size Vz bus Y which converts it into a sixth data packet FF of a sixth variable length and supplies it to the receive buffer 43. This sixth data packet FF is then transferred to the local host 25 for use or storage via the fixed speed Fs, fixed size Fz bus X. In example of this conversion process for a 100 Mtps data packet received from the link Z, converter 53 converts the 1 bit serial input data received from the link into 2 bit output parallel data forming the fifth data packet EE. Converter 45 then activates two serial to parallel converters, each converting the 1 bit serial input data into 16 bit parallel output data forming the sixth data packet FF. For a 400 Mtps data packet transfer received from the link Z, converter 53 converts the 1 bit serial input data received from the link Z into 8 bit parallel output data forming the fifth data packet EE. Consequently, converter 45 activates 8 serial to parallel converters, each converting the 1 bit serial input data into 4 bit parallel output data forming the sixth data packet FF.

Again, in order to enable the second module to set the receive converter 53 to the correct size setting for converting the fourth data packet DD into the fifth data packet EE, a speed message, which describes the speed of the fourth data packet DD on the link Z and which is transmitted by a transmitting node 3 coupled to the multi-speed bus, must be received prior to receipt of the fourth data packet DD. By knowing the speed at which the fourth data packet DD will be received and the fixed speed of the bus Y, the controller 50 determines the size of the fifth data packet EE (as described above). Additionally, a value representing the size of the fifth data packet EE is transmitted to the controller 40 of the first module 21 so that it may also set its receive converter 45 to the correct size setting for receiving the fifth data packet EE. In order to inform the controller 50 of the last data bit transfer it must make so as to transfer the entire fifth data packet EE on the bus Y, the arbiter 55 transmits to the controller 50 an end of transmission message. Similarly, so as to transfer the entire sixth data packet FF on the bus X, the controller 40 of the first module 21 must determine the length of the sixth data packet FF by way of knowing the size of the fifth data packet EE (in addition to the size of the bus X) and by receiving an end of transmission message from the controller 50.

It is further noted that in the above descriptions, it has been assumed that the local host 25, the first module 21 and the second module 22 each comprise a plurality of transmitters and receivers for enabling the data packet transfers on the first, second and third busses X, Y, Z. Specifically, the local host 25 requires a plurality of transmitter and a plurality of receiver for transmitting and receiving data packets on the first bus X. The receive buffer 43, the transmit converter 44 and the controller 40 of the first module 21 require a plurality of transmitters for transmitting data packets and control information on the first and second busses X, Y, respectively. The transmit buffer 42, the receive converter 45 and the controller 40 of the first module 21 also require a plurality of receivers for receiving data packets and control information from the first and second busses X, Y, respectively. Similarly, the receive converter 53, the external ports 7 and the controller 50 of the second module 22 require a plurality of transmitters for transmitting data packets and control information on the second and third busses Y, Z, respectively. The transmit converter 52, the external ports 7 and controller 50 also require a plurality of receivers for receiving data packet from the second and third busses Y, Z, respectively.

Figure 5:
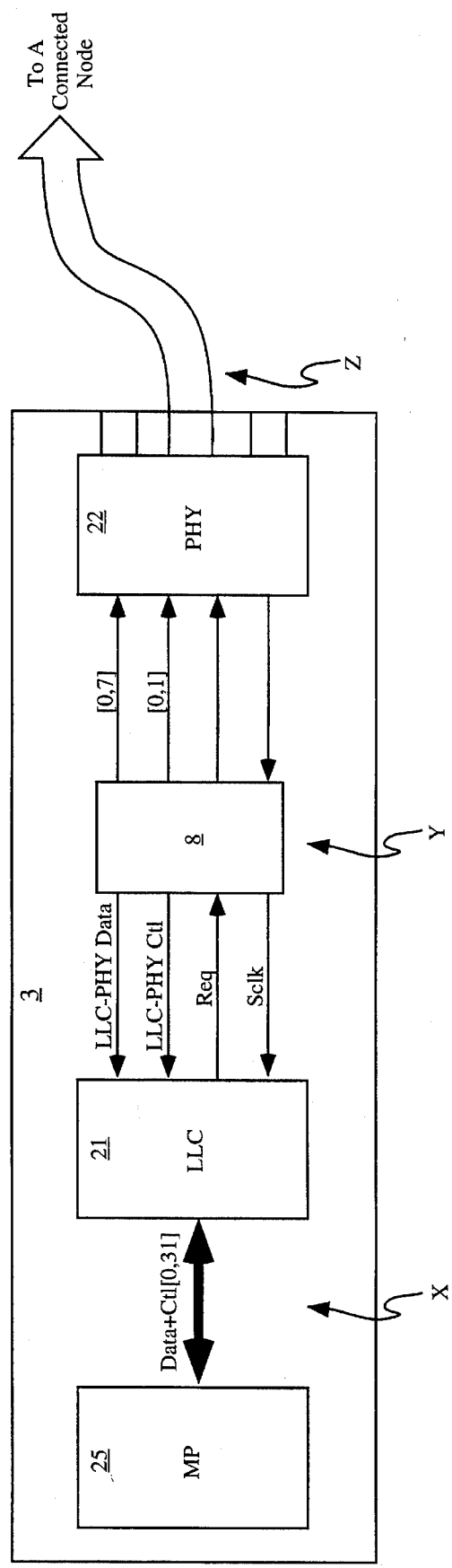
FIG. 5 is a block diagram of a specific implementation of the PHY and LLC chips forming the scalable PHY-LLC interface, showing a preferred placement of the isolation barrier within the fixed speed, variable size interface.

According to a second embodiment of the present invention, as shown in FIGS. 1 and 5, the first and second modules 21, 22 comprising the novel fixed speed Fs, variable size Vz interface are implemented in a bus architecture designed pursuant to the IEEE P1394 Standards Document P1394 entitled "High Performance Serial Bus" (draft 5.3v1 of Oct. 14, 1992). This document is appended hereto as Appendix A for reference. The standard described in P1394 is designed to permit the arbitrary coupling of nodes 3 together, as shown in FIG. 1, to form the multi-speed serial bus referenced above. To implement the interface pursuant to the P1394 standard, the first module forms a link layer chip (or "LLC"), while the second module 22 forms a physical channel interface chip (or "PHY").

Through such an implementation of the present invention, as shown in FIGS. 1, 2 and 5, the PHY is able to perform multi-speed data packet transfers via the multi-speed link Z while performing fixed speed data packet transfers to the LLC via the fixed speed Fs, variable size Vz bus Y. In this way, the PHY not only permits the utilization of low speed nodes 3 together with faster speed nodes 3 for optimum performance of the multi-speed bus, but also enables a scalable architecture in which newer and faster PHYs designed pursuant to the technological standard of the time can be implemented without having to redesign the bus architecture or the nodes 3 coupled thereto.

In terms of design, the LLC is implemented using standard digital IC technology like gate arrays and standard cells. As such, there are significant advantages to integrating the LLC with the other functions of the local host 25. Also, the LLC is generally host specific—its architecture being a function of the local host 25 of the node 3 that it serves. The PHY, on the other hand, is generally not host specific such that a single PHY design can be utilized with almost all nodes 3 coupled to the multi-speed bus that have a specific speed capability.

With respect to the specific design of the PITY used in the present invention, a PHY block diagram is shown in FIG. 9a, with expanded block diagrams of the PITY showing a port 147, a first transceiver 120 and a second transceiver 140 in FIGS. 9b, 9c and 9d, respectively. The PHY comprises a plurality of external ports 147 for connecting the PHY to a plurality of links Z; a speed signaling controller 159 comprising the speed signaling circuit shown in FIG. 2 for controlling the reception, transmission, decoding and encoding of the speed messages transferred between nodes 3; an arbitration controller 158 comprising the bus arbiter (also shown in FIG. 2) for performing arbitration and other bus control operations; a resynchronizer 162 for regenerating, synchronizing and amplifying both the incoming and outgoing data packets; a transmit bus 157 for transmitting the outgoing data packets from the local host 25, the controller 150 and the resynchronizer 162 to the transceivers 120, 140 of the ports 147; a receive bus 156 for receiving the incoming data packets from the transceivers 120, 140 of the ports 147 for use by the controller 150, the resynchronizer 162 and the local host 25 (the transmit bus 157 and the receive bus 156 providing a unidirectional flow of each the outgoing and incoming data packet to facilitate use of the resynchronizer 162); a PHY controller 150 for controlling operations of the PHY elements as described above; a transmit converter 152 and a receive converter 153 for converting the parameters of the various signals also described above; and a plurality of PHY-LLC interface drivers and receivers 154 for the transmission and reception of signals on the bus Y.

Each port 147 of the PITY comprises two transceivers 120, 140 and a multiplexor 160. With respect to the first transceiver 120, this transceiver 120 is directly coupled to one twisted pair of differential signals wires of the external link Z and comprises a differential transmitter 121 used for transmitting both differential data and differential arbitration signals; a differential binary receiver 122 for receiving data signals in a half duplex transmission mode; a differential ternary receiver 123 for receiving control signals comprising arbitration signals in a full duplex transmission mode; and a common mode receiver 124 for receiving speed signals transmitted concurrently with the arbitration signals via a common mode technique. With respect to the second transceiver 140, this transceiver 140 is directly coupled to the other twisted pair of differential signal wires of the external link Z and comprises a differential transmitter 141 used for transmitting both differential data and differential arbitration signals; a common mode transmitter 142 used for transmitting the speed messages over the link Z; a differential binary receiver 143 for receiving data signals in a half duplex transmission mode; a differential ternary receiver 144 for receiving control signals comprising arbitration signals in a full duplex transmission mode; and a differential preemptive signaling receiver 145 for receiving preemptive messages transferred from an adjacent node 3 so as to provide a means for terminating the concurrent transmission of data signals from the first transceiver 120 to the adjacent node 3.

Furthermore, the multiplexor 160 connects the transceivers input, output and control lines to the other elements of the PHY and its operation is supervised by the arbitration controller 158. The speed signaling controller 159 controls the common mode, speed signaling transmitter 142 and the common mode, speed signaling receiver 124 located in each port, while the arbitration controller 158 performs such functions as bus initialization, bus transformation, bus identification and bus arbitration. It is noted that the various elements and corresponding functions of the PHY described above can be implemented using standard electronic circuits and well-known components.

In addition to both the PHY and the LLC, the general implementation of a node 3 should also contain an "isolation barrier" for both electrical safety and electro-magnetic compatibility reasons (denoted as numeral 8 in FIG. 5). Such a device provides galvanic isolation between the bus circuits and the local host's circuits. At least theoretically, the isolation barrier 8 can be located at the interface between the PHY and the link Z, at the interface between the LLC and the PHY or at the interface between the local host 25 and the LLC. In practical terms, however, the interface between the local host 25 and the LLC is not a reasonable choice because of its complexity and specific dependence upon the local host 25.

With respect to providing upward compatibility in a multi-speed bus designed pursuant to the P1394 standard, one possible method is to develop a specific LLC-PHY pair each time new technology creates the possibility for higher speed capabilities in addition to a shift in the cost-performance optimum point. Yet, because the LLC design is intimately connected to the local host's functions, this approach implies a very broad design effort; partial redesign of the local host 25 for each node, redesign of the LLC and redesign of the PHY. However, since the PHY is not dependent on the local host 25, its redesign needs to be done only once for every new speed capability advancement.

A second approach (the approach taken in the present invention) is to develop a scalable interface architecture which enables new, technologically more advanced PHY designs to be connected to existing LLCs with no significant change. Thus in general, the upgrade to a higher speed capability for an entire set of nodes 3 requires only a single PHY redesign and implementation. This type of scalable interface architecture provides the following significant advantages:

1) A simple means for upgrading PHYs which are capable of higher speed data packet transfers with no design modifications to the LLC and local host 25. This upgrade is in general discussed as a design level upgrade (including the design of new nodes 3), but it is also possible to see it as a field level upgrade (where an already existing node 3 is upgraded to a higher speed capability simply by replacing the PHY and certain components of the isolation barrier 8).

2) A fixed speed Fs, variable length VL interface ideally suited for the insertion an isolation barrier 8 having a greatly simplified construction due to the simplicity in the transmission speed requirements. While several possible implementations of the isolation barrier 8 exist (optocouplers, transformers, capacitors, etc.), it is best implemented using isolation pulse transformers due to cost and performance reasons. However, if this type of isolation barrier 8 is placed at the interface between the PHY and the link Z, as it is usually done, it will clearly require a significant increase in its complexity. This is because the parameters of the isolation pulse transformer must be adapted to the different transmission speeds of the data transfers occurring on the multi-speed link Z. Therefore, in the present invention, the isolation barrier 8 is placed at the interface between the LLC and the PHY since this is an ideal fixed speed interface.

3) With respect to the specific P1394 implementation, this architecture also provides the means for exchanging status and control information between the LLC and the PHY in a manner which minimizes the number of physical interconnect lines required between the PHY and the LLC. This also maintains the fixed speed information exchange characteristic of this interface (both are done in order to reduce the complexity of the isolation barrier 8).

4) For the specific P1394 implementation, this architecture also provides a method for disabling the drivers on each side of the interface in case of interruption of the power distribution on either side of the isolation barrier 8. The existence of the isolation barrier 8 implies the existence of two separate power domains. One containing the LLC and the local host 25 and the other containing the bus (this is the collection of all the PHYs connected to the multi-speed serial bus plus a range of special nodes 3 which are not galvanically isolated from the bus). It should be clear that the power distribution in these two domains is uncorrelated, and as such, power can be interrupted at any time in any one of the two. If power is available in one and not in the other, a risk of malfunction exists if the interface drivers of the powered domain attempt to drive signals into the interface receivers of the unpowered domain.

Figure 3:
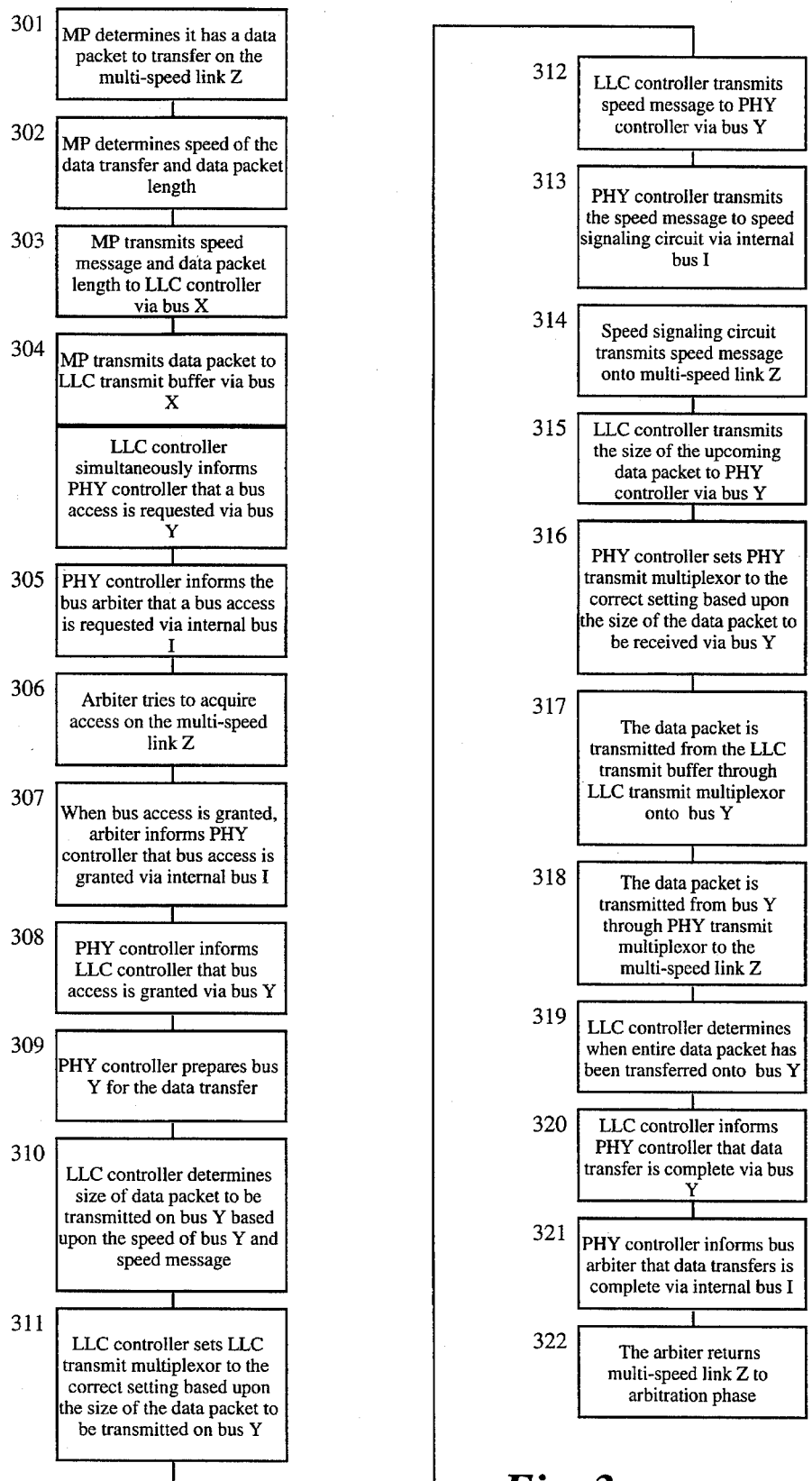
FIG. 3 is a flow chart for the transmit mode or operation of the present invention in which a data packet generated by the local host of a node is transmitted onto the multi-speed link Z.

The following is a detailed description of the transmit and receive operations of the present invention pursuant to the particular design of the embodiment shown in FIG. 2. In the transmit operation, as shown in the flowchart of FIG. 3, the local host 25 (or microprocessor "MP") of the node 3 generates a data packet to be transferred onto the multi-speed link Z for reception by another node 3 coupled thereto. In step 301 of the transmit operation, the MP 25 of the first node 1 determines that it needs to transfer a data packet on the bus. In step 302, the MP 25 determines the speed at which the transfer will take place in addition to the length of the data packet. The determination of the data packet speed is performed through the exchange of speed messages between nodes 3, wherein the MP 25 selects the highest speed capability shared by the transmitting node 3, the intended receiving node 3, and all relaying nodes 3 disposed between those two nodes 3 on the multispeed bus. The length of the data packet to be transferred is determined by virtue of the data available to the MP 25 in addition to the acceptable length of a data packet transfer in accordance with the higher level protocols that govern the operation of the multi-speed bus.

In step 303, the MP 25 transmits a value representing the data packet's length and a speed message describing the speed of the intended data packet transfer to the LLC controller 40 via bus X. In step 304, the MP 25 transmits its data packet to the LLC transmit FIFO buffer 42 which is managed by the LLC controller 40. Simultaneously with the receipt of the data by the LLC transmit FIFO buffer 42 in step 304, the LLC controller 40 informs the PHY controller 50 that a bus access is requested (i.e., by transmitting a bus request to the PHY controller 50) via bus Y. In step 305, the PHY controller 50 informs the bus arbiter 55 through the PHY internal bus I that a bus transfer is requested by the MP 25.

In step 306, the bus arbiter 55 attempts to acquire access on the multispeed link Z. In step 307, when the bus arbiter 55 receives access to the link Z, it informs the PHY controller 50 of this fact through the internal bus I. In step 308, the PHY controller 50 informs the LLC controller 40 via the bus Y that access to the multi-speed link Z has been granted for the desired data packet transfer (i.e., through the transmission of a bus grant). In step 309, the PHY controller 50 prepares the bus Y for such a transfer. In step 310, the LLC controller 40 determines the size of the data packet to be transmitted on bus Y by multiplying the speed of the link Z by the its size (i.e., one bit in the preferred embodiment) and divides the resulting quantity by the speed of the fixed speed Fs bus Y. In step 311, the LLC controller 40 sets the transmit converter 44 to the correct setting for the conversion of the data packet's size.

It is noted that although the determination of the data packet's size and the setting of the transmit converter 44 could have been previously done (i.e., after step 3), it is preferable that the transmit converter 44 not be set until access to the link Z has been given. This is because the transfer of an incoming data packet from the multi-speed link Z is given the highest priority over all other transfers which may take place between the PHY and the LLC, including the transfer of control information.

In step 312, the LLC controller 40 transmits the speed message generated by the MP 25 to the PHY controller 50 through the bus Y. In step 313, the PHY controller 50 transmits the speed message to the speed signaling circuit 59 through the internal bus I. The speed signaling circuit 59 manages the exchange speed messages on the multi-speed link Z, which messages describe the transmission rate of the data packets to be transmitted to and received from the multi-speed link Z. The speed signaling circuit 59 designates the value of a data speed label through the use of a memory device such as a register that is associated with each PHY. In this manner, when the PHY receives a data packet from the bus Y, it will automatically know at what rate to transmit the data packet on the multi-speed link Z.

In step 314, the speed signaling circuit 59 transmits the speed message onto the multi-speed link Z for reception by the other nodes 3 coupled thereto. In step 315, the LLC controller 40 communicates to the PHY controller 50 the size of the data transfer to be received from the bus Y. In step 316, the PHY controller 50 sets the transmit converter 52 accordingly. In step 317, the data packet is transmitted from the transmit FIFO buffer 42 through the transmit converter 44 onto the bus Y. In step 318, the data packet is transmitted from the bus Y through the transmit converter 52 to the multispeed link Z. According to the P1394 standard, the PHY controller 50 actually transfers the data packet to all external ports 7 coupled to nodes 3 which have the speed capability to receive the data packet transfer at the particular speed determined by the MP 25. In step 319, the LLC controller 40 determines when the entire data packet has been sent, and in step 320, it informs the PHY controller 50 that the transfer of the data packet has been completed (i.e., through the transmission of an end of transfer message). In step 321, the PHY controller 50 informs the bus arbiter 55 of the completed data packet transfer, and in step 322, the arbiter 55 returns the multi-speed link Z to the arbitration phase.

Figure 4:
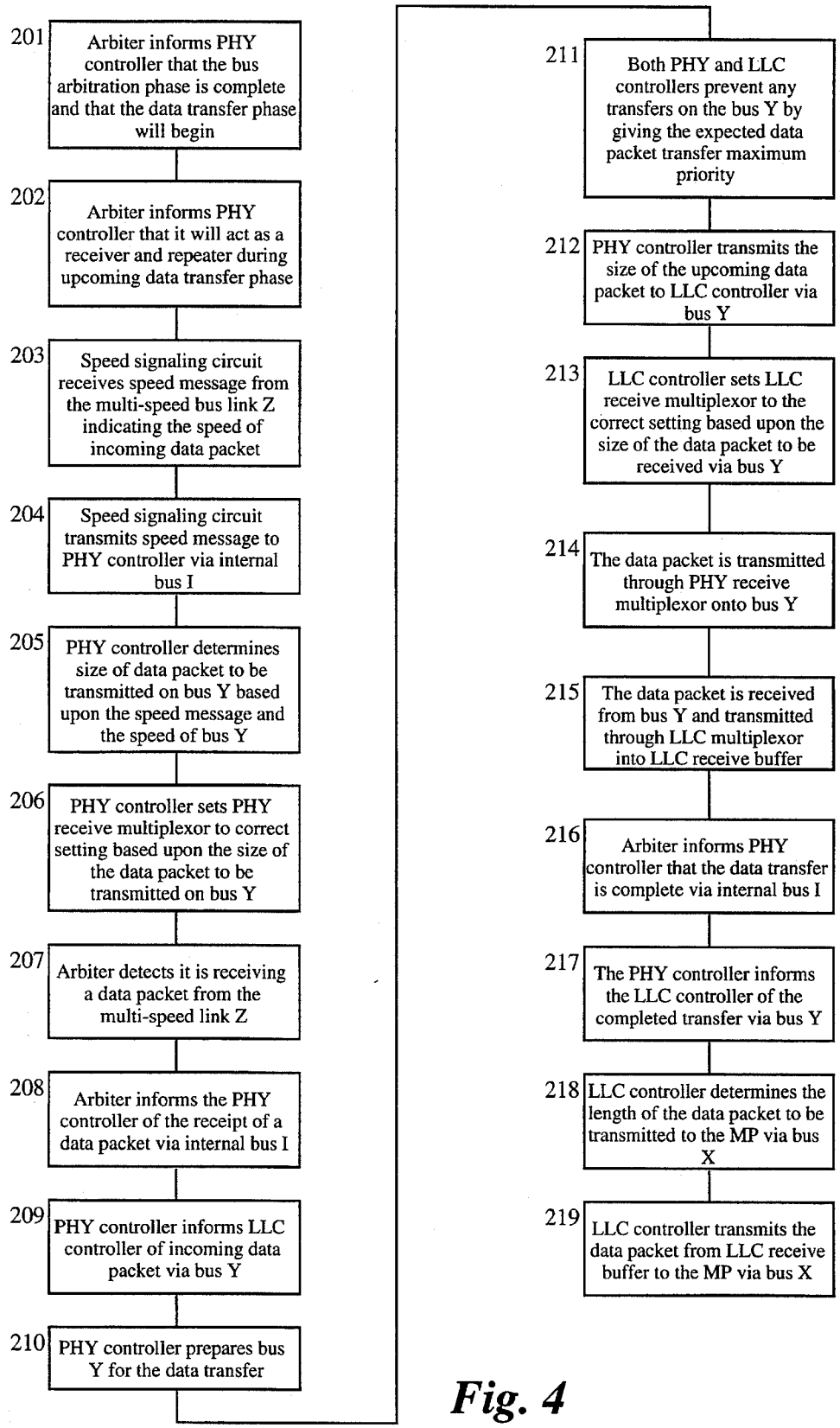
FIG. 4 is a flow chart for the receive mode or operation of the present invention in which a data packet transferred on the multi-speed link Z is received by the local host of a node.

In the receive operation, as shown in the flowchart of FIG. 4, the MP 25 generates a data packet to be transmitted onto the multi-speed link Z for reception by a node 3 coupled thereto. In step 201 of the receive operation, the bus arbiter 55 informs the PHY controller 50 that a bus arbitration phase has been completed and that a data transfer phase is about to begin. In step 202, the arbiter 55 also communicates to the PHY controller 50 that it will operate as a receiver and a repeater during the upcoming data transfer. In step 203, the speed signaling circuit 59 receives a speed message from the link Z describing the speed of the incoming data packet transfer. In step 204, the speed signaling circuit 59 informs the PHY controller 50 of the incoming data packet's speed by transmitting the received speed message thereto via the internal bus I. In step 205, the PHY controller 50, knowing the speed of the incoming data packet as well as the apriori defined speed of the bus Y, determines the size of the upcoming data transfer on the bus Y by multiplying the speed of the incoming data transfer on the link Z by the size of the link Z and dividing the resulting quantity by the speed of the fixed speed Fs bus Y. In step 206, the PHY controller 50 sets the receive converter 53 to the correct setting for the conversion. In step 207, the bus arbiter 55 detects the receipt of the initial bit of a data packet by the receive converter 53. However, if an arbitration phase is resumed before receipt of the expected data packet, then no data packet will be received, in which case, the PHY cancels all data receive preparations and resumes the receive operation from step 1 (not shown).

In step 208, the bus arbiter 55 informs the PHY controller 50 of the receipt of a data packet. In step 209, the PHY controller 50 informs the LLC controller 40 of the receipt of an incoming data packet. In step 210, the PHY controller 50 prepares the bus Y for the upcoming data packet transfer. In step 211, maximum priority is given to this transfer on the bus Y by preempting any other transfers that may be under way on bus Y (for example, a bus request from the LLC controller 40 to the PHY controller 50). It should be noted that a data packet transfer from the LLC to the PHY could not have been under way since a data packet transfer takes place only when the PHY has received access to the multi-speed link Z. Therefore, no other data packet transfers are expected from the link Z, and the only type of transfer that might be preempted on bus Y, is in general a control information exchange between the PHY and LLC controllers 50 and 40.

In step 212, the PHY controller 50 transmits a value representing the size of the data packet to the LLC controller 40 via bus Y. In step 213, the LLC controller 40 sets the receive converter 45 accordingly. In step 214, the data packet is received from the link Z and immediately transmitted through the PHY receive multiplexor 53 onto the bus Y. It is preferable that the PHY does not contain any FIFO buffers for storage of the received data packet as this adds to the simplicity of the PHY design which enhances its ability to be easily upgraded. In step 215, the data packet is received from the bus Y and transmitted through the receive converter 45 into the receive FIFO buffer 43. In step 216, the bus arbiter 55 informs the PHY controller 50 that the data packet transfer has been completed via the internal bus I. In step 217, the PHY controller 50 informs the LLC controller 40 of the completed data packet transfer via bus Y. In step 218, the LLC controller 40 determines the length of the data packet to be transmitted to the MP 25 via bus X. In step 219, the data packet is transmitted from the LLC receive FIFO buffer 43 to the MP 25 via the bus X. Additionally, the LLC controller 40 may perform other functions like address validation and error checking so as to avoid useless transfers of uninteresting or corrupted data bits to the MP 25. The LLC controller 40 may also perform other bus protocol functions like acknowledge transfer to relieve the MP 25 of such tasks and improve the utilization of the multi-speed link Z and the bus X.

In the receive operation described above, the performance of steps 208 through 213 in preparation for conversion and transmission of the data packet from the PHY to the LLC is accomplished in the time of the single transfer cycle between reception of the initial bit and the second bit of the data packet being transmitted on the link Z. In actuality, there is no delay in (or complication in the timing of) the data packet transfer from the link Z to the bus Y. This is because the interface is designed with respect to the conversion processes of the converters such that the bus Y can transfer no fewer than 2 bits at a time to accommodate the difference in the size and speed between the link Z and the local host's bus X. If the next higher size of the bus Y, i.e., 4 bits, were utilized to accommodate a higher transfer speed on the link Z, then the beginning of the data packet transfer on the bus Y would have to wait 4 transfer cycles until the initial transfer could be made. In this case, steps 208 through 213 would still be performed during the initial transfer cycle.

With reference to the speed and size of the busses X, Y and the link Z utilized in the present invention, and hence those of the resulting data packets, it is noted that the selection of the specific maximum speed and size of each bus is determined pursuant to the technological capabilities (both actual and potential) existing at the time of the implementation of the present invention. In this manner, the maximum capabilities of the nodes 3 coupled to the multi-speed bus can be fully realized. Because the maximum speeds, sizes and lengths of the data packets are chosen for a specific implementation, it would be obvious to one skilled in the art any combination of parameters may be used depending upon the particular utilization of the multi-speed bus.

For example, the multi-speed link Z may comprise a plurality of transmission rates such as 100 Mtps, 200 Mtps, 400 Mtps, etc. Due to the fact that it is a serial bus, the size of the resultant data packets is limited to one bit such that the length of a particular data packet transferred on the multi-speed link Z is the number of bits which that packet contains (i.e., 32, 128, 256, 512, etc. bits). Similarly, the bus Y interconnecting the PHY and the LLC may operate at a transmission speed of 50 Mtps and have a maximum size of 8 bits such that the corresponding sizes and lengths of the data packets comprise either 2, 4 or 8 bits and 4, 8, 16 or 32 transfers, respectively. Furthermore, the bus X interconnecting the LLC with the local host 25 may operate at a transmission speed of 6.25 Mtps and have a maximum size of 32 bits. As a specific example of one of the above described conversion processes, a data packet having a length of 128 bits is transferred on a link Z at a speed of 200 Mtps such that it will be converted by the PHY for transmission on a 50 Mtps bus Y into a data packet having a size of 4 bits and a length of 32 transfers. Similarly, this data packet BB will then be converted by the LLC for transmission on the 6.25 Mtps bus X into a yet another data packet having a size of 32 bits and a length of 4 transfers.

Next, with reference to FIG. 5 and Table 1, a specific implementation of the bus Y forming the novel PHY-LLC interface will be described. The bus Y comprises a plurality of bi-directional data lines, the number of which is dependent upon the maximum speed of the PHY (i.e., 2 lines for each 100 Mtps). For PHY's of 100, 200 and 400 Mtps, the number of data lines would be 2, 4, and 8 bits wide, respectively.

TABLE 1

| Name | I/O (wrt LLC) | Description |
|---|---|---|
| D[0:7] | IO | Data |
| Control[0:1] | IO | Control |
| Req | O | LLC Request port |
| SClk | I | 49.152 MHz |

The first symbol presented on the data lines before a data packet transfer is the speed message, of which D[0:1] indicates the speed at which the data packet is to be transferred. The speed messages for each of the proposed data packet transmission rates are shown in Table 2 below. This encoding is used both for the first symbol of the data packet and for the speed message in the arbitration request on the request line ("Req" line).

TABLE 2

| Transmission Rate | D |
|---|---|
| 100 Mtps | 00 |
| 200 Mtps | 01 |
| 400 Mtps | 10 |

TABLE 2-continued

| Transmission Rate | D |
|---|---|
| >400 Mtps | 11 |

The bus Y also comprises a plurality of bi-directional control lines, which in the preferred implementation comprises 2 lines; the number of control lines is independent of the transmission speed. The encoding of these lines is shown in Tables 3 and 4:

TABLE 3

| | When the PHY is driving: | |
|---|---|---|
| Control[0:1] | State | Meaning |
| 00 | Idle | Transmission complete, release bus |
| 01 | Status | The PHY is sending status information to the LLC |
| 10 | Receive | An incoming signal is being transferred from the PHY to the LLC |
| 11 | Transmit | The LLC is granted the bus to send a signal |

TABLE 4

| | When the LLC is driving (upon a grant from the PHY): | |
|---|---|---|
| Control[0:1] | State | Meaning |
| 00 | Idle | Transmission complete, release bus |
| 01 | reserved | reserved |
| 10 | Hold | The LLC is holding the bus while preparing data |
| 11 | Transmit | The LLC sending a signal to the PHY |

In this specific embodiment of the bus Y, there are three basic operational modes, two of which were described above in general terms: transmit, receive, and status. All of these are initiated by the PHY, however, the LLC can request a transmit operation through a transfer on the Req line. In each of the transmit and receive operations, the data packets received from the link Z by the PHY are transferred to the LLC in parallel via bus Y on as many data lines as necessary to accommodate the transmission rate of that particular data packet transfer on the link Z. In addition, the data transfer is synchronous, responsive to a clock signal which is continuously generated by the PHY. In the transmit operation, all data and control lines are directed from the LLC to the PHY, and in the receive operation, they are directed from the PHY to the LLC. Any unused lines are maintained at 0 by either the PITY or the LLC depending upon which one is in control of the bus at that time.

Figure 6:
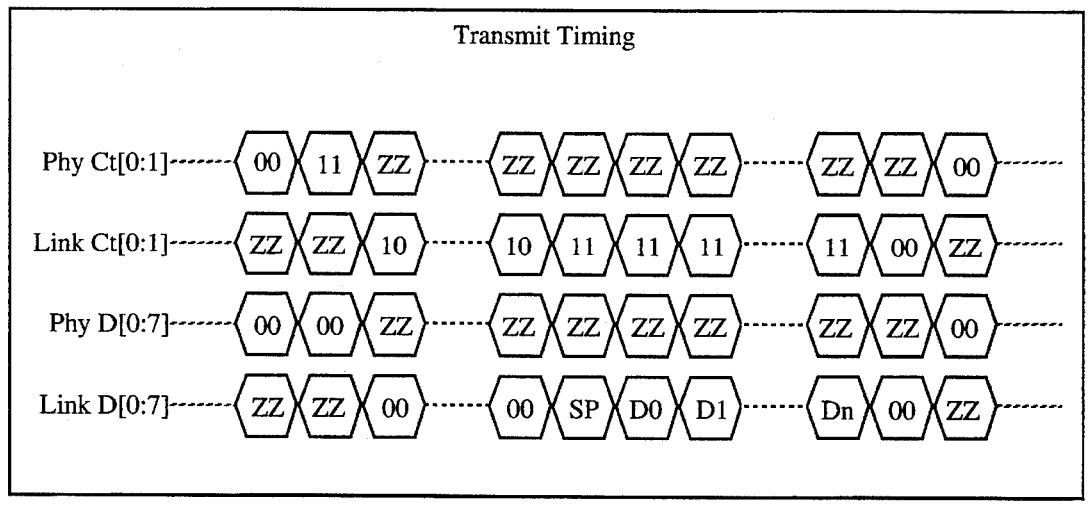
FIG. 6 is a timing diagram for the transmit mode or operation of the present invention in which a data packet generated by the local host of a node is transmitted onto the multi-speed link Z.

In the transmit operation, the LLC requests access to the multi-speed bus through the request line. Once the PHY has successfully arbitrated for and won the multi-speed link bus, it grants the bus to the LLC by asserting transmit on the control lines for one SClk cycle. After sampling the transmit state, the LLC asserts hold, or transmit on the control lines until it has sent all the data bits forming the data packet. Whenever the LLC changes state from hold to transmit, it places the speed message on the data lines with the first transmit state before continuing with the data packet transfers. The LLC may alternate between hold and transmit as many times as is necessary to support the P1394 protocol. (The cases in which it would actually send more than one data packet without arbitrating are when sending isochronous data or when performing a unified response.) The timing for the transmit operation is shown in FIG. 6. In the diagram, SP refers to the speed message and D0 through Dn are the data bits of the data packets.

To request the bus or to access a PHY register (not shown), the LLC sends a short serial stream of data bits to the PHY on the request line. The LLC can do this at any time. The information sent includes the type of request, the speed at which the data packet is to be sent, and an optional read or write command. The serial bit transfer can be either 6 bits or 19 bits, depending on whether or not a register access is being performed. The timing for the request line and the definition of the bits in the transfer are shown below in Tables 5 and 6.

TABLE 5

| Bit(s) | Name | Description |
| --- | --- | --- |
| 0–2 | Request Type | Indicates which type of bus request is being made. See the table below for definition of this field. |
| 3–4 | Request Speed | The speed at which the PHY will be sending the packet for this request. This field is encoded the same as the speed message from the first symbol of the packet. |
| 5 | Register Access | If this bit is set, a PHY register access will follow this bit. If not set, the transfer will terminate without a register access. |
| 6 | Read/Write | Indicates the type of access which follows. |
| 7–10 | Address | The internal PHY address to be read or written. |
| 11–18 | Data | For a write transfer, the data to be written to the specified address. |

TABLE 6

The request type field is encoded as follows:

| LR[0:2] | Name | Meaning |
| --- | --- | --- |
| 000 | None | No request |
| 001 | TakeBus | Take control of the bus immediately, NO arbitration |
| 010 | IsoReq | Arbitrate for the bus, no gaps |
| 011 | PriReg | Arbitrate after a priority gap |
| 100 | FairReq | Arbitrate when fair, using fair gap and fair bit |

Figure 7:
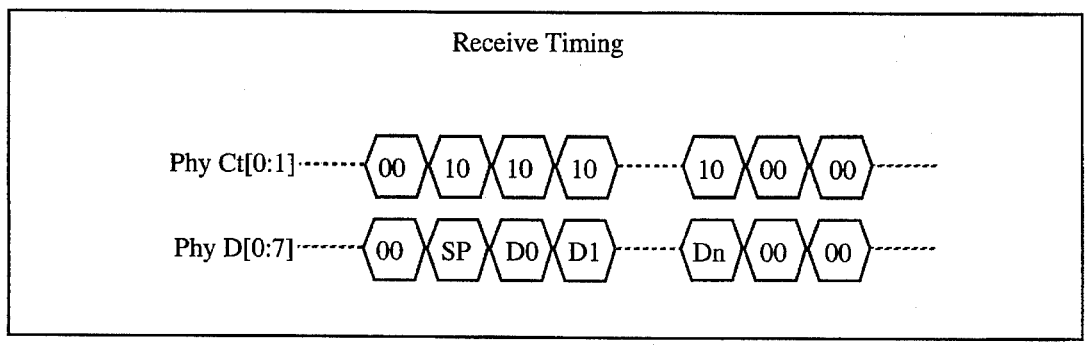
FIG. 7 is a timing diagram for the receive mode or operation of the present invention in which a data packet transferred on the multi-speed link Z is received by the local host of a node.

In the receive operation, whenever the PHY receives a data packet from the link Z, it initiates a receive operation by asserting receive on the control lines along with the speed message on the data lines. It then continues transferring the remainder of the incoming data packet on the data lines, holding receive on the control lines until the last data bit of the data packet has been transferred. The timing for the receive mode is shown in FIG. 7.

In the status operation, set-up data is passed serially from the PHY to the LLC on data line D0 and from the LLC to the PHY on data line D1. The rest of the data lines, if present, are not used. The data transfer is synchronous and the clock signal is aligned with the center of the data bit cell and is continuously generated by the PHY. Data line D0 is directed from the PHY to the LLC and data line D1 is directed from the LLC to the PHY. The control lines C0 and C1 are directed from the PHY to the LLC during this mode.

When the PHY has status information to transfer to the LLC, it will initiate a status transfer. If the status information warrants it, the PHY will interrupt another control transfer in progress in order to initiate the status transfer. Otherwise, the PHY will wait until the interface is idle to perform the status transfer. The PHY initiates the transfer by asserting status (01b) on the control lines, along with the first two status bits on the data lines D[0:1]. The status transfer may be interrupted by an incoming data packet transfer. The timing for the status transfer and the definition of the bits of the transfer are shown in Table 7 below.

TABLE 7

| Bit(s) | Name | Description |
| --- | --- | --- |
| 0 | Fair Gap | The PHY has detected that the serial bus has been idle for a fair gap time |
| 1 | Bus Reset | The PHY has entered bus reset state |
| 2 | PHY Interrupt | The PHY is requesting an interrupt to the host reserved |
| 3 | reserved | reserved |
| 4–7 | Address | Optional address of register being transferred |
| 8–15 | Data | Optional data corresponding to the Address field |

In addition to the foregoing operations, this specific embodiment of the PHY-LLC interface according to the P1394 standard further requires the use of a power-off mode. Due to the fact that the P1394 bus architecture is implemented as a collection of point-to-point interconnections (as shown in FIG. 1), each node 3 connected to the multi-speed serial bus has to perform a repeater function in order to relay the data packets and other information throughout the entire network of arbitrarily interconnected nodes 3. A node 3 connected to the bus, which receives information through one of its PHY ports 7, has to either retransmit the same or equivalent data or control information through each of its other ports 7. Because of this feature, it is dear that there is the danger that a node 3 may not be able to perform the necessary repeating function if its local host's power is off. To avoid such a situation, the bus distributes sufficient power to maintain the repeating function of every node connected to the bus even if the local host's power is itself off.

Similarly, it is foreseeable that a situation might exist where the bus is not powered even though a specific node 3 coupled thereto is powered by a local power supply. For example, when all the ports 7 of a given node are disconnected or there is no node 3 connected to the bus which can supply power to the bus. In both cases, however, either the PHY or the LLC may be powered while the other is not powered. As previously mentioned, this may cause a serious problem such as a device failure when the powered module attempts to communicate with the unpowered module. In such a situation, the powered module may activate the input protection circuits of the unpowered module, thereby shortening the life of both modules.

Figure 8:
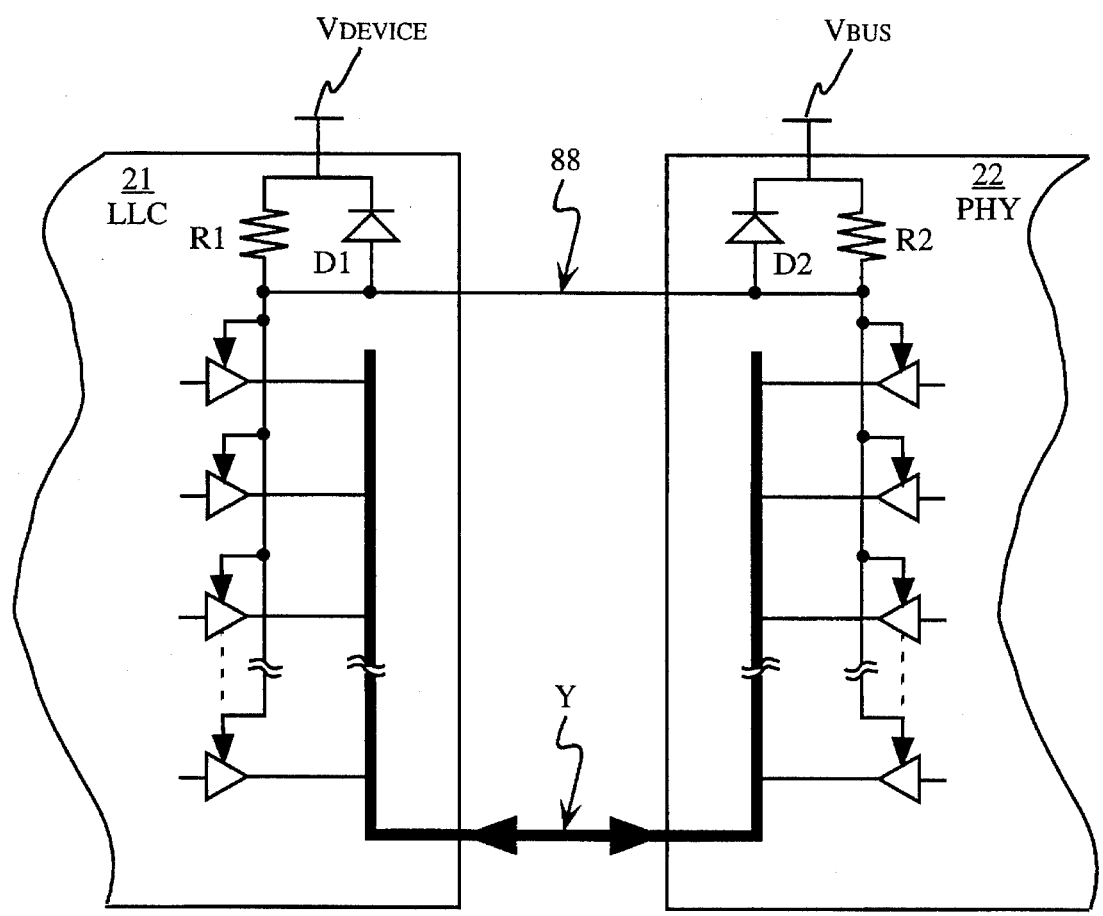
FIG. 8 is a circuit diagram showing a specific implementation of the power off sense line in the PHY-LLC interface.

Therefore, in order to avoid this situation, the present invention further provides a power off sense line 88 implemented in the PHY-LLC interface forming the bus Y as shown in FIG. 8. When both modules 21, 22 are powered, the power off sense line 88 is maintained in a "high" state through the use of the resistors R1 and R2 (each of approximately 20 KΩ) which enables the transmitters of the bus Y for each module 21, 22. If either of the two modules 21, 22 loses power, the power off sense line 88 is brought to a "low" state by the diodes D1 (for a loss of power in the LLC) or D2 (for a loss of power in the PHY). The low state of the power off sense line 88 automatically disables the transmitters of the bus Y for the still powered module. In this manner, if the power of a node 3, and hence the LLC therein, is for some reason turned off, the PHY for that node 3 may still act as a receiver and a repeater in order that transfer of data packets between adjacent nodes 3, and hence, along the multi-speed bus, is not interrupted.

While the present invention has been described in conjunction with the above-embodiments, it is evident that numerous alternatives, depictions, variations and uses will be apparent to those skilled in the art in light of the foregoing description.

We claim:

1. A method for transferring fixed size, variable length data packets from a first node to a second node via a variable speed, fixed size link forming a multi-speed bus, the first node coupled to a first device comprising a local host for managing the operations of the first device, the method comprising:

transferring a fixed size, variable length first data packet generated by the local host of the first device to a first module via a fixed speed, fixed size first bus, the first module comprising a first converter;

converting the first data packet into a variable size, variable length second data packet;

transferring the second data packet from the first module onto a fixed speed, variable size second bus;

supplying the second data packet from the second bus as input to a second module, the second module comprising a second converter and a port connecting the second module to the link;

converting the second data packet into a fixed size, variable length third data packet;

transferring the third data packet to the second node via the link.

2. The method according to claim 1, wherein prior to transferring the first data packet to the first module, the method further comprises the steps of:

generating a speed message by the local host of the first device, the speed message describing the speed at which the third data packet will be transferred to the second node via the link;

transferring the speed message to a first controller of the first module;

calculating a value representing the size of the second data packet by the first controller through use of the speed message received from the local host and the fixed speed of the second bus; and setting the first converter comprising at least one multiplexor to the correct size setting in accordance with the calculated size value for conversion of the first data packet into the second data packet.

3. The method according to claim 2, wherein prior to transferring the second data packet onto the second bus, the method further comprises the steps of:

transferring the calculated size value of the second data packet from the first controller to a second controller of the second module; and setting the second converter comprising at least one multiplexor to the correct size setting in accordance with the calculated size value for conversion of the second data packet into the third data packet.

4. The method according to claim 1, wherein the steps of transferring the second data packet from the first module onto the second bus and supplying the second data packet from the second bus as input to the second module is performed by the steps of:

transmitting a first electrical signal representing the second data packet from the first module onto the second bus;

supplying the first electrical signal as input to an isolation barrier coupled to the second bus between the first and second modules, the isolation barrier galvanically isolating circuits of the first module from circuits of the second module;

generating as output from the isolation barrier an electrically isolated second signal representing the second data packet; and transmitting the electrically isolated second signal from the isolation barrier to the second module via the second bus.

5. In a computer system having a plurality of devices arbitrarily coupled together via a plurality of variable speed, fixed size links forming a multi-speed bus for the transfer of data packets between the devices of the computer system, each device of the computer system comprising a node coupled to at least one of the plurality of links via at least one of a plurality of ports, a method is provided for transferring a fixed size, variable length third data packet from a first node of a first device onto a variable speed, fixed size link for reception by a second node coupled to the link, the first device comprising a local host for managing the operations of the first device, the method comprising:

transferring a fixed size, variable length first data packet generated by the local host of the first node to a buffer associated with a first module via a first fixed speed, fixed size bus, the first module comprising a first converter and a first controller for managing the operations of the first module;

supplying the first data packet from the buffer as input to the first converter of the first module;

converting the first data packet into a variable size, variable length second data packet;

transferring the second data packet from the first converter onto a fixed speed, variable size second bus;

supplying the second data packet from the second bus as input to a second converter of a second module, the second module comprising the second converter, a port connecting the second module to the link and a second controller for managing the operations of the controller;

converting the second data packet into the third data packet;

transferring the third data packet to the second node via the link.

6. The method according to claim 5, wherein prior to transferring the first data packet to the buffer associated with the first module, the method further comprises the steps of:

generating a speed message by the local host of the first device, the speed message describing the speed at which the third data packet will be transferred to the second node via the link;

transferring the speed message to the first controller of the second module;

calculating a value representing the size of the second data packet by the first controller through use of the speed message received from the local host and the fixed speed of the second bus; and setting the first converter comprising at least one multiplexor to the correct size setting in accordance with the calculated size value for conversion of the first data packet into the second data packet.

7. The method according to claim 6, wherein prior to transferring the second data packet onto the second bus, the method further comprises the steps of:

transferring the calculated size value of the second data packet from the first controller to the second controller of the second module; and setting the second converter comprising at least one multiplexor to the correct size setting in accordance with the calculated size value for conversion of the second data packet into the third data packet.

8. The method according to claim 5, wherein the steps of transferring the second data packet from the first converter onto the second bus and supplying the second data packet from the second bus as input to the second converter of the second module is performed by the steps of:

transmitting a first electrical signal representing the second data packet from the first converter onto the second bus;

supplying the first electrical signal as input to an isolation barrier coupled to the second bus between the first and second modules, the isolation barrier galvanically isolating circuits of the first module from circuits of the second module;

generating as output from the isolation barrier an electrically isolated second signal representing the second data packet; and transmitting the electrically isolated second signal from the isolation barrier to the second converter via the second bus.

9. In a computer system having a plurality of devices arbitrarily coupled together via a plurality of variable speed, fixed size links forming a multi-speed bus for the transfer of data packets between the devices of the computer system, each device of the computer system comprising a node coupled to at least one of the plurality of links via at least one of a plurality of ports, a method is provided for transferring a fixed size, variable length third data packet from a first node of a first device onto a variable speed, fixed size link for reception by a second node coupled to the link, the first device further comprising a local host for managing the operations of the first device, the method comprising:

generating a speed value by the local host representing the speed at which the third data packet is to be transferred to the second node via the link;

generating a length value by the local host representing the length of a fixed size, variable length first data packet to be transferred from the local host to a first module via a fixed speed, fixed size first bus, the first module comprising an associated buffer, a first converter and a first controller for managing the operations of the first module;

transferring both the speed value and the length value from the local host to the first controller via the first bus;

transferring the first data packet from the local host to the buffer via the first bus;

generating a bus request message by the first controller for requesting access to the multi-speed bus;

transferring the bus request message from the first controller to a second controller of a second module via a fixed speed, variable size second bus, the second module comprising a second converter, a port connecting the second module to the link, the second controller for managing the operations of the second module, a bus arbiter for arbitrating on the multi-speed bus and an internal bus for coupling the second controller with the bus arbiter;

transferring the bus request message from the second controller to the bus arbiter via the internal bus;

acquiring access to the multi-speed bus by the bus arbiter;

generating a bus grant message by the bus arbiter when access to the multi-speed bus is granted to the first node;

transferring the bus grant message from the bus arbiter to the second controller via the internal control bus;

transferring the bus grant message from the second controller to the first controller via the second bus;

preparing the second bus by the second controller for transfer of a variable size, variable length second data packet from the first module to the second module;

calculating a value representing the size of the second data packet by the first controller through use of the speed value received from the local host and the fixed speed of the second bus;

setting the first converter to the correct size setting in accordance with the calculated size value for conversion of the first data packet into the second data packet;

transferring the speed value from the first controller to the second controller via the second bus;

transferring the speed value from the second controller onto the link for transmission to the second node;

transferring the calculated size value of the second data packet from the first controller to the second controller via the second bus;

setting the second converter of the second module to the correct size setting in accordance with the calculated size value for conversion of the second data packet into a third data packet;

supplying the first data packet from the buffer as input to the first converter;

converting the first data packet into the second data packet as the first data packet is supplied through the first converter;

transferring the second data packet output from the first converter onto the second bus;

supplying the second data packet from the second bus as input to the second converter of the second module;

converting the second data packet into the third data packet as the second data packet is supplied through the second converter;

transferring the third data packet output from the second converter onto the link;

generating an end of transmission message by the first controller when the second data packet has been supplied from the first converter onto the second bus;

transferring the end of transmission message from the first controller to the second controller via the second bus;

transferring the end of transmission message from the second controller to the bus arbiter via the internal bus; and placing the multi-speed bus in an arbitration phase by the bus arbiter.

10. The method according to claim 9, wherein the step of transferring the speed value from the second controller onto the link for transmission to the second node is performed by the steps of:

transferring the speed value from the second controller to a speed signaling circuit of the bus arbiter via the internal control bus; and transferring the speed value from the speed signaling circuit onto the link for transmission to the second node.

11. The method according to claim 9, wherein the steps of transferring the second data packet output from the first converter onto the second bus and supplying the second data packet from the second bus as input to the second converter where the second data packet is converted into the third data packet is performed by the steps of:

transmitting a first electrical signal representing the second data packet from the first converter onto the second bus;

supplying the first electrical signal as input to an isolation barrier coupled to the second bus between the first and second modules, the isolation barrier galvanically isolating circuits of the first module from circuits of the second module;

generating as output from the isolation barrier an electrically isolated second signal representing the second data packet; and transmitting the electrically isolated second signal from the isolation barrier to the second converter via the second bus.

12. A method for receiving data packets transferred from a second node onto a variable speed, fixed size link for reception by a first node, the first node coupled to a first device having a local host for managing the operations of the first device, the method comprising:

receiving a fixed size, variable length first data packet from the link by a first module connected to the link, the first module comprising a port connecting the link to the first module and a first converter;

supplying the first data packet as input to the first converter of the first module;

converting the first data packet into a variable size, variable length second data packet;

transferring the second data packet from the first converter onto a fixed speed, variable size second bus;

supplying the second data packet from the second bus as input to a second converter of a second module;

converting the second data packet into a fixed size, variable length third data packet; and transferring the third data packet to the local host of the first device via a fixed speed, fixed size third bus.

13. The method according to claim 12, wherein prior to receiving the first data packet from the link by the first module connected to the link, the method further comprises the steps of:

receiving a speed message by the first module, the speed message transferred by the second node via the link, the speed message describing the speed at which the first data packet will be transferred to the first node via the link;

calculating a value representing the size of the second data packet by the first module through use of the speed message received from the link and the fixed speed of the second bus; and setting the first converter comprising at least one multiplexor to the correct size setting in accordance with the calculated size value for conversion of the first data packet into the second data packet.

14. The method according to claim 13, wherein prior to transferring the second data packet onto the second bus, the method further comprises the steps of:

transferring the calculated size value of the second data packet from the first module to the second module; and setting the second converter comprising at least one multiplexor to the correct size setting in accordance with the calculated size value for conversion of the second data packet into the third data packet.

15. The method according to claim 12, wherein the steps of transferring the second data packet from the first converter onto the second bus and supplying the second data packet from the first bus as input to the second module is performed by the steps of:

transmitting a first electrical signal representing the second data packet from the first converter onto the second bus;

supplying the first electrical signal as input to an isolation barrier coupled to the second bus between the first and second modules, the isolation barrier galvanically isolating circuits of the first module from circuits of the second module;

generating as output from the isolation barrier an electrically isolated second signal representing the second data packet; and transmitting the electrically isolated second signal from the isolation barrier to the second converter via the second bus.

16. In a computer system having a plurality of devices arbitrarily coupled together via a plurality of variable speed, fixed size links forming a multi-speed bus for the transfer of data packets between the devices of the computer system, each device of the computer system comprising a node coupled to at least one of the plurality of links via at least one of a plurality of ports, a method is provided for receiving by a first node of a first device a fixed size, variable length first data packet transferred by a second node via a variable speed, fixed size link coupled between the first and second nodes, the first device further comprising a local host for managing the operations of the first device, the method comprising:

receiving the first data packet from the link by a first module connected to the link, the first module comprising a port connecting the first module to the link, a first converter and a first controller for managing the operations of the first module;

supplying the first data packet as input to the first converter of the first module;

converting the first data packet into a variable size, variable length second data packet;

transferring the second data packet from the first converter onto a fixed speed, variable size second bus;

supplying the second data packet from the second bus as input to a second converter of a second module, the second module comprising the second converter, a buffer and a second controller for managing the operations of the second module;

converting the second data packet into a fixed size, variable length third data packet;

supplying the third data packet as input to the buffer; and transferring the third data packet to the local host via a fixed speed, fixed size third bus.

17. The method according to claim 16, wherein prior to receiving the first data packet from the link by the first module connected to the link, the method further comprises the steps of:

receiving a speed message by the first controller of the first module, the speed message transferred by the second node via the link, the speed message describing the speed at which the first data packet will be transferred to the first node via the link;

calculating a value representing the size of the second data packet by the first controller through use of the speed message received from the link and the fixed speed of the second bus; and setting the first converter comprising at least one multiplexor to the correct size setting in accordance with the calculated size value for conversion of the first data packet into the second data packet.

18. The method according to claim 17, wherein prior to transferring the second data packet onto the second bus, the method further comprises the steps of:

transferring the calculated size value of the second data packet from the first controller to the second controller of the second module; and setting the second converter comprising at least one multiplexor to the correct size setting in accordance with the calculated size value for conversion of the second data packet into the third data packet.

19. The method according to claim 16, wherein the steps of transferring the second data packet from the first converter onto the second bus and supplying the second data packet from the first bus as input to the second converter of the second module is performed by the steps of:

transmitting a first electrical signal representing the second data packet from the first converter onto the second bus;

supplying the first electrical signal as input to an isolation barrier coupled to the second bus between the first and second modules, the isolation barrier galvanically isolating circuits of the first module from circuits of the second module;

generating as output from the isolation barrier an electrically isolated second signal representing the second data packet; and transmitting the electrically isolated second signal from the isolation barrier to the second converter via the second bus.

20. In a computer system having a plurality of devices arbitrarily coupled together via a plurality of variable speed, fixed size links forming a multi-speed bus for the transfer of data packets between the devices of the computer system, each device of the computer system comprising a node directly coupled to at least one of the plurality of links via one of a plurality of ports, a method is provided for receiving by a first node of a first device a fixed size, variable length first data packet transferred by a second node via a variable speed, fixed size link coupled between the first and second nodes, the first device further comprising a local host for managing the operations of the first device, the method comprising:

receiving a speed value by a first module of the first node, the speed value transferred on the link by the second node and representing the speed at which the first data packet will be transferred to the first node via the link, the first module comprising a first converter, a port connecting the first module to the link, a first controller for managing the operations of the first module, a bus arbiter for arbitrating on the multi-speed bus and an internal bus for coupling the first controller with the bus arbiter;

supplying the speed value received by the first module to the first controller;

calculating a value representing the size of a variable size, variable length second data packet to be transferred on a fixed speed, variable size second bus by the first controller through use of the speed value and the fixed speed of the second bus;

setting the first converter to the correct size setting in accordance with the calculated size value for conversion of the first data packet into the second data packet;

generating a data received message by the bus arbiter upon receiving a first data bit of the first data packet by the first converter of the first module;

transferring the data received message from the bus arbiter to the first controller via the internal bus;

transferring the data received message from the first controller to a second controller of a second module via the second bus, the second module comprising an associated buffer, a second converter and the second controller for managing the operations of the second module;

preparing the second bus by the first controller for transfer of the second data packet to the second module via the second bus;

transferring the calculated size value from the first controller to the second controller via the second bus;

setting the second converter of the second module to the correct size setting in accordance with the calculated size value for conversion of the second data packet into a fixed size, variable length third data packet;

supplying the first data packet from the link as input to the first converter;

converting the first data packet into the second data packet as the first data packet is supplied through the first converter;

transferring the second data packet output from the first converter onto the second bus;

supplying the second data packet from the second bus as input to the second converter;

converting the second data packet into the third data packet as the second data packet is supplied through the second converter;

supplying the third data packet output from the second converter as input to the buffer;

generating an end of transmission message by the bus arbiter when the first data packet has been supplied from the link to the first converter;

transferring the end of transmission message from the bus arbiter to the first controller via the internal bus;

transferring the end of transmission message from the first controller to the second controller via the second bus;

calculating a value representing the length of the third data packet to be transferred from the buffer to the local host via a fixed speed, fixed size third bus by the second controller;

transferring the third data packet from the buffer to the local host via the third bus; and completing transfer of the third data packet onto the third bus by the second controller in accordance with the calculated length value of the third data packet.

21. The method according to claim 20, wherein the steps of receiving a speed value by the first module of the first node coupled to the link by a port and supplying the speed value received by the first module to the first controller is performed by the steps of:

receiving the speed value by a speed signaling circuit of the bus arbiter; and transferring the speed value from the speed signaling circuit of the bus arbiter to the first controller via the internal bus.

22. The method according to claim 20, wherein the steps of transferring the second data packet output from the first converter onto the second bus and supplying the second data packet from the second bus as input to the second converter is performed by the steps of:

transmitting a first electrical signal representing the second data packet from the first converter onto the second bus;

supplying the first electrical signal as input to an isolation barrier coupled to the second bus between the first and second modules, the isolation barrier galvanically isolating circuits of the first module from circuits of the second module;

generating as output from the isolation barrier an electrically isolated second signal representing the second data packet; and transmitting the electrically isolated second signal from the isolation barrier to the second converter via the second bus.

23. An apparatus for transferring data packets from a first node to a second node via a variable speed, fixed size link forming a multi-speed bus, the first node coupled to a first device having a local host for generating a fixed size, variable length first data packet, the apparatus comprising:

a first module comprising a first converter for converting the first data packet into a variable size, variable length second data packet;

a fixed speed, fixed size first bus for transferring the first data packet from the local host to the first converter of the first module;

a second module comprising a second converter for converting the second data packet into a fixed size, variable length third data packet and a port connecting the second module to the link; and a fixed speed, variable size second bus for transferring the second data packet from the first converter of the first module to the second converter of the second module, the second converter supplying the third data packet to the port for transfer to the second node via the link.

24. The apparatus of claim 23, wherein the local host of the first node further generates a speed message for transfer to the first module via the first bus, the speed message describing the speed at which the third data packet will be transferred to the second node via the link, the first module calculating a value representing the size of the second data packet through use of the speed message and the fixed speed of the second bus and setting the first converter comprising at least one multiplexor to the correct size setting in accordance with the calculated size value for conversion of the first data packet into the second data packet.

25. The apparatus of claim 24, wherein the first module further transfers the calculated size value of the second data packet to the second module, the second module setting the second converter comprising at least one multiplexor to the correct size setting in accordance with the calculated size value for conversion of the second data packet into the third data packet.

26. The apparatus of claim 23, wherein the second bus comprises an isolation barrier for receiving as input a first electrical signal representing the second data packet and generating as output from the isolation barrier an electrically isolated second signal representing the second data packet.

27. The apparatus of claim 23, wherein the second bus comprises a power off sense line for disabling a plurality of transmitters of the first module coupled to the second bus when a local power supply of the first module is turned off and for disabling a plurality of transmitters of the second module coupled to the second bus when a local power supply of the second module is turned off.

28. The apparatus of claim 27, wherein the power off sense line comprises in each the first and second modules a circuit coupling in series an input from the power off sense line, a diode, a local power supply and a resistor with an enable input of each of the plurality of transmitters of the first and second modules, respectively, the circuit in each of the first and second modules further comprising a coupling between the base of the diode and a midpoint between the resistor and the plurality of transmitters.

29. In a computer system having a plurality of devices arbitrarily coupled together via a plurality of variable speed, fixed size links forming a multi-speed bus for the transfer of data packets between the devices of the computer system, each device of the computer system comprising a node coupled to at least one of the plurality of links via at least one of a plurality of ports, an apparatus is provided in a first node of a first device for transferring a fixed size, variable length third data packet to a second node via a variable speed, fixed size link, the first device comprising a local host for generating a fixed size, variable length first data packet, the apparatus comprising:

a first module comprising a buffer, a first converter, and a first controller for managing the operations of the first module;

a fixed speed, fixed size first bus for coupling the local host to the first module and transferring the first data packet from the local host to the buffer of the first module, the buffer supplying the first data packet to the first converter, the first converter converting the first data packet into a second variable size, variable length data packet;

a second module comprising a second converter, a port connecting the second module to the link and a second controller for managing the operations of the second module; and a fixed speed, variable size second bus for transferring the second data packet from the first converter of the first module to the second converter of the second module, the second converter converting the second data packet into the third data packet and supplying the third data packet to the port for transfer to the second node via the link.

30. The apparatus of claim 29, wherein the local host of the first device further generates a speed message for transfer to the first controller of the first module via the first bus, the speed message describing the speed at which the third data packet will be transferred to the second node via the link, the first controller calculating a value representing the size of the second data packet through use of the speed message and the fixed speed of the second bus and setting the first converter comprising at least one multiplexor to the correct size setting in accordance with the calculated size value for conversion of the first data packet into the second data packet.

31. The apparatus of claim 30, wherein the first controller further transfers the calculated size value of the second data packet from the first controller to the second controller of the second module, and the second controller sets the second converter comprising at least one multiplexor to the correct size setting in accordance with the calculated size value for conversion of the second data packet into the third data packet.

32. The apparatus of claim 29, wherein the second bus comprises an isolation barrier for receiving as input a first electrical signal representing the second data packet and generating as output from the isolation barrier an electrically isolated second signal representing the second data packet.

33. The apparatus of claim 29, wherein the second bus comprises a power off sense line for disabling a plurality of transmitters of the first module coupled to the second bus when a local power supply of the first module is turned off and for disabling a plurality of transmitters of the second module coupled to the second bus when a local power supply of the second module is turned off.

34. The apparatus of claim 33, wherein the power off sense line comprises in each the first and second modules a circuit coupling in series an input from the power off sense line, a diode, a local power supply and a resistor with an enable input of each of the plurality of transmitters of the first and second modules, respectively, the circuit in each of the first and second modules further comprising a coupling between the base of the diode and a midpoint between the resistor and the plurality of transmitters.

35. An apparatus for receiving fixed size, variable length data packets transferred from a second node to a first node via a variable speed, fixed size link forming a multi-speed bus, the first node coupled to a first device having a local host for processing of the received data packets, the apparatus comprising:

a first module of the first node comprising a port for connecting the first module to the link and a first converter, the first converter receiving a fixed size, variable length first data packet from the link via the port and converting the first data packet into a variable size, variable length second data packet;

a second module comprising a second converter for converting the second data packet into a fixed size, variable length third data packet;

a fixed speed, variable size first bus for transferring the second data packet from the first converter of the first module to the second converter of the second module; and a fixed speed, fixed size third bus for transferring the third data packet from the second converter of the second module to the local host of the first device.

36. The apparatus of claim 35, wherein the first module receives from the link a speed message transferred by the second node, the speed message describing the speed at which the first data packet will be transferred to the first node via the link, the first module calculating a value representing the size of the second data packet through use of the speed message and the fixed speed of the second bus and setting the first converter comprising at least one multiplexor to the correct size setting in accordance with the calculated size value for conversion of the first data packet into the second data packet.

37. The apparatus of claim 36, wherein the first module further transfers the calculated size value of the second data packet to the second module, the second module setting the second converter comprising at least one multiplexor to the correct size setting in accordance with the calculated size value for conversion of the second data packet into the third data packet.

38. The apparatus of claim 35, wherein the second bus comprises an isolation barrier for receiving as input a first electrical signal representing the second data packet and generating as output from the isolation barrier an electrically isolated second signal representing the second data packet.

39. The apparatus of claim 35, wherein the second bus comprises a power off sense line for disabling a plurality of transmitters of the first module coupled to the second bus when a local power supply of the first module is turned off and for disabling a plurality of transmitters of the second module coupled to the second bus when a local power supply of the second module is turned off.

40. The apparatus of claim 39, wherein the power off sense line comprises in each the first and second modules a circuit coupling in series an input from the power off sense line, a diode, a local power supply and a resistor with an enable input of each of the plurality of transmitters of the first and second modules, respectively, the circuit in each of the first and second modules further comprising a coupling between the base of the diode and a midpoint between the resistor and the plurality of transmitters.

41. In a computer system having a plurality of devices arbitrarily coupled together via a plurality of variable speed, fixed size links forming a multi-speed bus for the transfer of data packets between the devices of the computer system, each device of the computer system comprising a node coupled to at least one of the plurality of links via at least one of a plurality of ports, an apparatus is provided in a first node of a first device for receiving a fixed size, variable length first data packet transferred by a second node via a variable speed, fixed size link, the first device comprising a local host for processing of the first data packet, the apparatus comprising:

a first module of the first node comprising a port for connecting the first module to the link, a first converter and a first controller for managing the operations of the first module, the first converter receiving the first data packet from the first link via the port and converting the first data packet into a variable size, variable length second data packet;

a second module comprising a buffer, a second converter and a second controller for managing the operations of the second module;

a fixed speed, variable size first bus for transferring the second data packet from the first converter to the second converter of the second module, the second converter converting the second data packet into a variable size, variable length third data packet and supplying the third data packet to the buffer; and a fixed speed, fixed size third bus for transferring the third data packet from the buffer of the second module to the local host of the first device.

42. The apparatus of claim 41, wherein the first controller of the first module receives from the link a speed message transferred by the second node, the speed message describing the speed at which the first data packet will be transferred to the first node via the link, the first controller calculating a value representing the size of the second data packet through use of the speed message and the fixed speed of the second bus and setting the first converter comprising at least one multiplexor to the correct size setting in accordance with the calculated size value for conversion of the first data packet into the second data packet.

43. The apparatus of claim 42, wherein the first controller further transfers the calculated size value of the second data packet to the second controller of the second module, the second controller setting the second converter comprising at least one multiplexor to the correct size setting in accordance with the calculated size value for conversion of the second data packet into the third data packet.

44. The apparatus of claim 41, wherein the second bus comprises an isolation barrier for receiving as input a first electrical signal representing the second data packet and generating as output from the isolation barrier an electrically isolated second signal representing the second data packet.

45. The apparatus of claim 41, wherein the second bus comprises a power off sense line for disabling a plurality of transmitters of the first module coupled to the second bus when a local power supply of the first module is turned off and for disabling a plurality of transmitters of the second module coupled to the second bus when a local power supply of the second module is turned off.

46. The apparatus of claim 45, wherein the power off sense line comprises in each the first and second modules a circuit coupling in series an input from the power off sense line, a diode, a local power supply and a resistor with an enable input of each of the plurality of transmitters of the first and second modules, respectively, the circuit in each of the first and second modules further comprising a coupling between the base of the diode and a midpoint between the resistor and the plurality of transmitters.

* * * * *